United States Patent
Wei et al.

(10) Patent No.: US 11,032,872 B2
(45) Date of Patent: Jun. 8, 2021

(54) APPARATUS AND METHOD FOR DELETING SESSION CONTEXT

(71) Applicant: HUAWEI TECHNOLOGIES CO., LTD., Guangdong (CN)

(72) Inventors: Anni Wei, Shenzhen (CN); Yizhuang Wu, Beijing (CN); Chunshan Xiong, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/721,305

(22) Filed: Dec. 19, 2019

(65) Prior Publication Data

US 2020/0128609 A1 Apr. 23, 2020

Related U.S. Application Data

(63) Continuation of application No. PCT/CN2018/090884, filed on Jun. 12, 2018.

(30) Foreign Application Priority Data

Jun. 20, 2017 (CN) .......................... 201710470791.8

(51) Int. Cl.
*H04W 60/06* (2009.01)
*H04W 4/24* (2018.01)
(Continued)

(52) U.S. Cl.
CPC ........... *H04W 76/30* (2018.02); *H04W 60/06* (2013.01); *H04W 92/24* (2013.01)

(58) Field of Classification Search
CPC ....... H04W 8/20; H04W 76/20; H04W 75/11; H04W 75/27; H04W 75/30; H04W 50/06;
(Continued)

(56) References Cited

U.S. PATENT DOCUMENTS 10,462,840 B2 * 10/2019 Dao ...................... H04W 76/30
10,728,952 B2 * 7/2020 Dao ..................... H04L 65/1069
(Continued)

FOREIGN PATENT DOCUMENTS

CN 101064696 A 10/2007
CN 103685286 A 3/2014
(Continued)

OTHER PUBLICATIONS

"Support of a Multi-access Session in 5G Mobile Network" Jeounglak Ha and Young-Il Choi Jan. 2019, 2019 25th Asia-Pacific Conference on Communications (APCC) (Year: 2019).*
(Continued)

*Primary Examiner* — William D Cumming
(74) *Attorney, Agent, or Firm* — Womble Bond Dickinson (US) LLP

(57) ABSTRACT

A method and an apparatus for deleting a session context are provided, to resolve a technical problem of how to delete an SM context from an SMF after abnormal network disconnection. The method includes: receiving, by a session management function entity, a packet data unit PDU session release request; and deleting, by the session management function entity based on the PDU session release request, a PDU session context that is stored in the session management function entity and that is of a terminal, where the PDU session context is a PDU session context that is not deleted after the terminal is abnormally deregistered.

14 Claims, 27 Drawing Sheets

(51) Int. Cl.
*H04W 76/12* (2018.01)
*H04W 76/30* (2018.01)
*H04W 76/38* (2018.01)
*H04W 92/24* (2009.01)

(58) Field of Classification Search
CPC ....... H04W 60/06; H04W 4/24; H04W 76/30; H04W 76/38; H04W 76/12; H04W 36/0022
See application file for complete search history.

(56) References Cited

U.S. PATENT DOCUMENTS

| | | | | |
|---|---|---|---|---|
| 10,798,770 | B2* | 10/2020 | Dou | H04W 76/12 |
| 10,813,165 | B2* | 10/2020 | Dao | H04L 67/143 |
| 10,820,368 | B2* | 10/2020 | Dao | H04W 36/0022 |
| 10,827,536 | B2* | 11/2020 | Kim | H04L 67/14 |
| 2018/0376446 | A1* | 12/2018 | Youn | H04W 60/06 |
| 2019/0069327 | A1* | 2/2019 | Kim | H04W 4/24 |
| 2020/0092934 | A1* | 3/2020 | Dou | H04W 76/38 |
| 2020/0128609 | A1* | 4/2020 | Wei | H04W 76/30 |

FOREIGN PATENT DOCUMENTS

| | | | |
|---|---|---|---|
| EP | 3340730 | A1 | 6/2018 |
| EP | 3547769 | A1 | 10/2019 |
| EP | 3550867 | A1 * | 10/2019 |
| WO | 2017019118 | A1 | 2/2017 |
| WO | 2017029909 | A1 | 2/2017 |

OTHER PUBLICATIONS

Support of a Multi-access Session in 5G Mobile Network by Jeounglak Ha; Young-Il Cho Published in: 2019 25th Asia-Pacific Conference on Communications (APCC) Mar. 2020 (Year: 2020).*

IEEE Recommended Practice for Local and metropolitan area networks by IEEE Computer Society and the IEEE Microwave Theory and Techniques Society Mar. 2004 (Year: 2004).*

LG Electronics, De-registration procedure (TS 23.502). SA WG2 Meeting #118-BIS Jan. 16-20, 2017 Spokane, WA, USA, S2-170079, 5 pages.

3GPP TS 23.401 V13.11.0 (Jun. 2017),3rd Generation Partnership Project;Technical Specification Group Services and System Aspects;General Packet Radio Service (GPRS) enhancements for Evolved Universal Terrestrial Radio Access Network(E-UTRAN) access(Release 13),dated Jun. 12, 2017,total 376 pages.

3GPP TS 23.502 V0.4.0 (May 2017),3rd Generation Partnership Project;Technical Specification Group Services and System Aspects;Procedures for the 5G System;Stage 2(Release 15),total 124 pages.

LG Electronics et al: "TS 23.502: Update of DN authorization",3GPP Draft; S2-173388, May 9, 2017 (May 9, 2017), XP051268835,total 10 pages.

Huawei et al: "TS 23.502 POU Session Rel ease Procedure",3GPP Draft; S2-172002, Mar. 26, 2017 (Mar. 26, 2017), XP051247735,total 3 pages.

* cited by examiner

APPARATUS AND METHOD FOR DELETING SESSION CONTEXT

CROSS-REFERENCE TO RELATED APPLICATIONS

This application is a continuation of International Application No. PCT/CN2018/090884, filed on Jun. 12, 2018, which claims priority to Chinese Patent Application No. 201710470791.8, filed on Jun. 20, 2017. The disclosures of the aforementioned applications are hereby incorporated by reference in their entireties.

TECHNICAL FIELD

Embodiments of the present application relate to the field of communications technologies, and in particular, to a method and an apparatus for deleting a session context.

BACKGROUND

In a 4th generation (4G) mobile communications technology evolved packet system (EPS) network, a mobile management (MM) context and a session management (SM) context of a user are both managed and maintained by a mobility management entity (MME). If user equipment (UE) is abnormally disconnected from the network, only a user context stored in the MME needs to be deleted after the user equipment accesses the network again. In a 5th generation (5G) mobile communications technology system, functions of the MME are separated into an access and mobility management function (AMF) entity and a session management function (SMF) entity. The AMF entity is configured to manage a mobile context of a user, and the SMF entity is configured to manage a session context. In the 5G system, if a user context needs to be deleted, an MM context needs to be deleted from the AMF and an SM context needs to be deleted from the SMF.

If UE is normally deregistered, the MM context may be deleted from the AMF and the SM context may be deleted from the SMF before the deregistration. If the UE is abnormally deregistered, after the UE is deregistered, the MM context before the UE is deregistered may still be stored in the AMF, and the SM context before the UE is deregistered may still be stored in the SMF.

SUMMARY

Embodiments of the present application provide a method and an apparatus for deleting a session context, to resolve a technical problem about how to delete an SM context from an SMF after a terminal is abnormally deregistered.

According to a first aspect, a method for deleting a session context is provided. The method may be performed by a session management function entity. For example, the session management function entity is an SMF entity. The method includes: receiving, by a session management function entity, a packet data unit (PDU) session release request; and deleting, by the session management function entity based on the PDU session release request, a PDU session context that is stored in the session management function entity and that is of a terminal, where the PDU session context is a PDU session context that is not deleted after the terminal is abnormally deregistered.

In this embodiment of the present application, if the session context stored in the session management function entity needs to be deleted, only a PDU session release message needs to be sent to the session management function entity, and the session management function entity may delete the PDU session context that is stored in the session management function entity and that is of the terminal before the terminal is abnormally disconnected from a network, so that the session context can be deleted from the session management function entity after the abnormal deregistration, and the terminal that accesses the network again after the abnormal deregistration can reestablish a new session context.

In one embodiment, after receiving the PDU session release request, the session management function entity may further send a PDU-CAN session context termination request to a policy control function entity, where the PDU-CAN session context termination request is used to instruct the policy control function entity to delete a PDU-CAN session context that is stored in the policy control function entity and that is of the terminal, and the PDU-CAN session context is a PDU-CAN session context that is not deleted after the terminal is abnormally deregistered.

Generally, in addition to the session management function entity, the policy control function entity may also store the session context of the terminal. The session context is referred to as a PDU session context if stored in the session management function entity, or referred to as a PDU-CAN session context if stored in the policy control function entity. In this embodiment of the present application, apart from deleting the PDU session context that is stored in the session management function entity and that is of the terminal, the session management function entity may also trigger the policy control function entity to delete the PDU-CAN session context stored in the policy control function entity. Therefore, session contexts before the terminal is abnormally deregistered may both be deleted, so that a new session context is established.

In one embodiment, the receiving, by a session management function entity, a PDU session release request includes: receiving, by the session management function entity, the PDU session release request sent by a unified data management entity; or receiving, by the session management function entity, the PDU session release request sent by an access and mobility management function entity; or receiving, by the session management function entity, the PDU session release request sent by the policy control function entity.

That is, in this embodiment of the present application, the session management function entity may be triggered by different network elements to delete the PDU session context. Different manners may be selected for different scenarios. This is relatively flexible and more capable of meeting requirements of different scenarios.

In one embodiment, the session management function entity is a session management function entity serving for the terminal before the terminal roams, and after receiving the PDU session release request, the session management function entity may also send the PDU session release request to another session management function entity, where the PDU session release request is used to instruct the another session management function entity to delete a PDU session context that is stored in the another session management function entity and that is of the terminal, and the another session management function entity is a session management function entity serving for the terminal after the terminal roams.

For example, the terminal originally accesses a network provided by an operator A, and the terminal then roams and accesses a network provided by an operator B. After accessing the network provided by the operator B, the terminal has a phenomenon of abnormal deregistration. Therefore, how to delete, from the network provided by the operator B, the session context before the terminal is abnormally deregistered needs to be considered. In this embodiment of the present application, the session management function entity before the terminal roams may be triggered to delete the PDU session context. In addition, the session management function entity may further trigger a session management function entity after the terminal roams to delete the PDU session context. Therefore, in a scenario in which the terminal roams, the PDU session context stored in the session management function entity can also be deleted, so that the terminal can normally access the network again and reestablish a PDU session context even if the terminal is abnormally disconnected from the network during roaming.

According to a second aspect, a method for deleting a session context is provided, and the method may be performed by a first device. The method includes: receiving, by the first device, a delete request message, where the delete request message is used to instruct the first device to trigger releasing a PDU session context that is not deleted after a terminal is abnormally deregistered; and sending, by the first device, a PDU session release request to a session management function entity, where the PDU session release request is used to instruct the session management function entity to delete the PDU session context stored in the session management function entity.

That is, the first device may trigger the session management function to delete the PDU session context stored in the session management function entity. The first device has a rather simple triggering manner in which only a PDU session release message needs to be sent to the session management function entity. After receiving the PDU session release message, the session management function entity may delete the PDU session context that is stored in the session management function entity and that is of the terminal before the terminal is abnormally disconnected from a network, so that the session context can be deleted from the session management function entity after the abnormal deregistration, and the terminal that accesses the network again after the abnormal deregistration can reestablish a new session context.

In one embodiment, the first device is a unified data management entity, an access and mobility management function entity, or a policy control function entity.

That is, in this embodiment of the present application, the session management function entity may be triggered by different network elements to delete the PDU session context. Different manners may be selected for different scenarios. This is relatively flexible and more capable of meeting requirements of different scenarios.

In one embodiment, if the first device is the policy control function entity, after receiving the delete request message sent by the access and mobility management function entity, the first device may further delete a PDU-CAN session context that is stored in the first device and not deleted after the terminal is abnormally deregistered.

Generally, in addition to the session management function entity, the policy control function entity may also store the session context of the terminal. In this embodiment of the present application, if the policy control function entity triggers the session management function entity to delete the PDU session context that is stored in the session management function entity and that is of the terminal, apart from triggering the session management function entity for deletion, the policy control function entity may also delete the PDU-CAN session context stored in the policy control function entity. Therefore, session contexts before the terminal is abnormally deregistered may both be deleted, so that a new session context is established.

According to a third aspect, a communications apparatus is provided. The communications apparatus has functions of the session management function entity in the foregoing methods. The functions may be implemented by hardware, or may be implemented by hardware executing corresponding software. The hardware or software includes one or more units corresponding to the foregoing functions.

In one embodiment, a structure of the communications apparatus may include a processor and a receiver. In one embodiment, the terminal device may further include a transmitter. The processor, the transmitter, and the receiver may perform a corresponding function in the method provided in the foregoing first aspect or any embodiment.

According to a fourth aspect, a communications apparatus is provided. The communications apparatus has functions of the first device in the foregoing methods. For example, the first device is a unified data management entity, an access and mobility management function entity, or a policy control function entity. The functions may be implemented by hardware, or may be implemented by hardware executing corresponding software. The hardware or software includes one or more units corresponding to the foregoing functions.

In one embodiment, a structure of the communications apparatus may include a receiver and a transmitter. In one embodiment, the terminal device may further include a processor. The processor, the transmitter, and the receiver may perform a corresponding function in the method provided in the foregoing second aspect or any embodiment.

According to a fifth aspect, a communications apparatus is provided. The communications apparatus may be the session management function entity in the foregoing methods, or a function module such as a chip disposed in the session management function entity. The communications apparatus includes: a memory, configured to store computer executable program code, a communications interface, and a processor, where the processor is coupled to the memory and the communications interface. The program code stored in the memory includes an instruction. When the processor executes the instruction, the instruction enables the communications apparatus to perform the method performed by the session management function entity in the foregoing first aspect or any embodiment.

According to a sixth aspect, a communications apparatus is provided. The communications apparatus may be the first device in the foregoing methods, or a function module such as a chip disposed in the first device. For example, the first device is a unified data management entity, an access and mobility management function entity, or a policy control function entity. The communications apparatus includes: a memory, configured to store computer executable program code, a communications interface, and a processor, where the processor is coupled to the memory and the communications interface. The program code stored in the memory includes an instruction. When the processor executes the instruction, the instruction enables the communications apparatus to perform the method performed by the first device in the foregoing second aspect or any embodiment.

According to a seventh aspect, a communications entity is provided. The communications entity includes a unit configured to perform a method provided in the foregoing first aspect or any embodiment.

According to an eighth aspect, a communications entity is provided. The communications entity includes a unit configured to perform a method provided in the foregoing second aspect or any embodiment.

According to a ninth aspect, a computer storage medium is provided, and is configured to store a computer software instruction used by the communications apparatus according to the foregoing third aspect, or the communications apparatus according to the fifth aspect, or the communications entity according to the seventh aspect, and includes a program designed for the session management function entity in the foregoing first aspect or any embodiment.

According to a tenth aspect, a computer storage medium is provided, and is configured to store a computer software instruction used by the communications apparatus according to the foregoing fourth aspect, or the communications apparatus according to the sixth aspect, or the communications entity according to the eighth aspect, and includes a program designed for the first device in the foregoing second aspect or any embodiment.

According to an eleventh aspect, a computer program product that includes an instruction is provided, and when the instruction is run on a computer, the computer is enabled to execute a program designed for the session management function entity in the first aspect or any embodiment.

According to a twelfth aspect, a computer program product that includes an instruction is provided, and when the instruction is run on a computer, the computer is enabled to execute a program designed for the first device in the second aspect or any embodiment.

In the embodiments of the present application, the PDU session context may be deleted only by sending the PDU session release message to the session management function entity, so that the session context can be deleted from the session management function entity after the abnormal deregistration.

DESCRIPTION OF EMBODIMENTS

Figure 1:
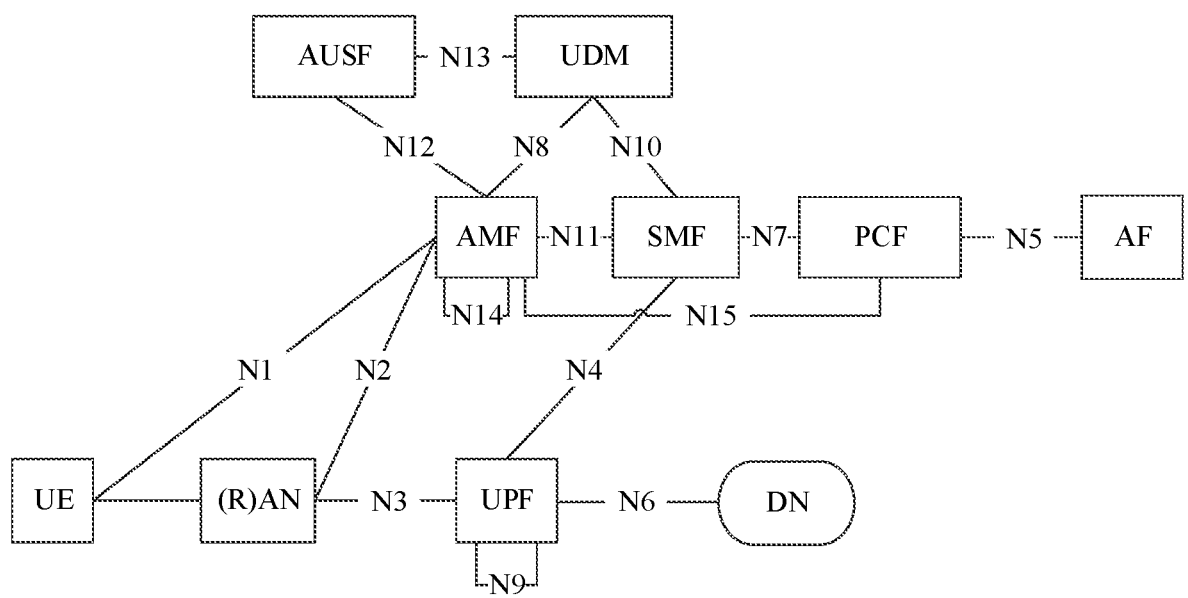
FIG. 1 is a diagram of network architecture of a 5G system according to an embodiment of the present application.

To make the objectives, technical solutions, and advantages of the embodiments of the present application clearer, the following further describes the embodiments of the present application in detail with reference to the accompanying drawings.

Technical solutions described in this specification may be used in a 5G system, or may be used in a next generation mobile communications system or another similar communications system.

In the following, some terms in the embodiments of the present application are described, to help persons skilled in the art have a better understanding.

(1) A network device, for example, including a base station (for example, an access point), may be a device that communicates with a wireless terminal device through one or more cells on an air interface in an access network. The base station may be configured to: mutually convert a received over-the-air frame and an Internet Protocol (IP) packet and serve as a router between the terminal device and a rest portion of the access network, where the rest portion of the access network may include an IP network. The base station may further coordinate attribute management of the air interface. For example, the base station may include an evolved NodeB (NodeB or eNB or e-NodeB) in an LTE system or an LTE-advanced (LTE-A) system, or may also include a next generation NodeB (gNB) in the 5G system. This is not limited in the embodiments of the present application.

(2) A terminal may include a device that provides a user with voice and/or data connectivity, for example, may be a handheld device with a wireless connection function, or a processing device connected to a wireless modem. The terminal may communicate with a core network through an access network (AN), and may exchange the voice and/or data with the AN. The AN may include a radio access network (RAN) and a wired access network. The terminal may include user equipment (UE), a wireless terminal, a mobile terminal, a subscriber unit, a subscriber station, a mobile station, a mobile, a remote station, an access point, a remote terminal, an access terminal, a user terminal, a user agent, a user device, or the like. For example, the terminal may be a mobile phone (or referred to as a "cellular" phone), a computer with a mobile terminal, a portable, pocket-sized, handheld, computer built-in, or in-vehicle mobile apparatus, a smart wearable device, or the like. For example, it may be a device such as a personal communication service (PCS) phone, a cordless telephone set, a session initiation protocol (SIP) phone, a wireless local loop (WLL) station, a personal digital assistant (PDA), a smartwatch, a smart helmet, smart glasses, or a smart band. The terminal may also be a limited device, such as a device with relatively low power consumption, or a device with a limited storage capability, or a device with a limited computing capability, or the like. For example, the terminal is an information sensing device such as a bar code, a radio frequency identification (RFID), a sensor, a global positioning system (GPS), a laser scanner, or the like.

(3) The terms "system" and "network" may be used interchangeably in the embodiments of the present application. "A plurality of" means two or more. Therefore, in the embodiments of the present application, "a plurality of" may also be understood as "at least two". The term "and/or" describes an association relationship between associated objects and represents that three relationships may exist. For example, A and/or B may represent the following three cases: Only A exists, both A and B exist, and only B exists. In addition, the character "/" generally indicates an "or" relationship between the associated objects.

Referring to FIG. 1, the following first introduces a diagram of a network architecture of the 5G system, and the diagram of the network architecture is also an architectural diagram of a network architecture to which the embodiments of the present application are applied. In FIG. 1, UE may communicate with an AMF entity through an (R)AN, where the AN communicates with the AMF entity through an N2 interface. In addition, the UE may also directly communicate with the AMF entity through an N1 interface. In addition, the AN further communicates with a user plane function (UPF) entity through an N3 interface. The UPF entity communicates with another UPF entity through an N9 interface. The UPF further communicates with a dedicated network (DN) entity through an N6 interface, and communicates with an SMF entity through an N4 interface. The AMF entity communicates with another AMF entity through an N14 interface. The AMF entity further communicates with the SMF entity through an N11 interface, communicates with an authentication server function (AUSF) entity through an N12 interface, communicates with a unified data management (UDM) entity through an N8 interface, and communicates with a policy control function (PCF) entity through an N15 interface. The SMF entity communicates with the UDM entity through an N10 interface, and communicates with the PCF entity through an N7 interface. The PCF entity communicates with an application function (AF) entity through an N5 interface.

It should be understood that, the (R)AN means a 3rd generation partnership project (3GPP) entity, for example, an eNB in an LTE system, or an NB in a universal mobile telecommunications system (UMTS).

An access and mobility management network element AMF is responsible for access management and mobility management of the UE, and is equivalent to mobile management MM in a mobility management entity (MME) in an LTE network framework during actual application, and access management is added to the AMF.

It should be understood that, the AMF may further be merged with a security anchor function (SEAF) and a security context management function (SCMF), that is, the AMF also has functions of the SEAF and the SCMF. The SEAF may also be independent of the AMF and be an independent network element. An authentication credential repository and processing function (ARPF) is mainly responsible for storing user subscription information, such as a long-term key. An authentication server function (AUSF) entity and an authentication credential repository and processing function (ARPF) entity interact with each other, and the AUSF terminates an authentication request from the SEAF. The AUSF and the ARPF may be understood as function network elements separated from a home subscriber server (HSS) in the LTE network framework. The SEAF and the AUSF interact with the UE, and the SEAF receives a middle key in a pre-deployment certification procedure, and the SEAF may be understood as a function network element separated from the MME in the LTE network framework. The SCMF obtains the middle key from the SEAF and a key of the SCMF and the SEAF is further derived. In one embodiment, the ARPF is merged into a unified data management (UDM) network element shown in the figure, and acts as a part of the UDM. In one embodiment, the SEAF and the SCMF may also be independently separated from the AMF, and the SEAF and the SCMF are used as an independent authentication function (AUF) network element.

The SMF is responsible for session management, such as user session establishment and the like, that is, a session management function in the MME. The UPF is a function network element of a UE user plane, mainly responsible for connecting an external network, and is equivalent to a combination of a serving gateway (SGW) and a packet data network gateway (PDN-GW) in LTE. A DN is a network responsible for providing services for the UE. For example, some DNs provide a network access function for the UE, and some other DNs provide a short message service message function for the UE, and the like. It should be noted that, some function elements/entities shown in the figure are irrelevant to the solution in this application, and details are not described herein again.

In the 5G system shown in FIG. 1, if a user context needs to be deleted, an MM context needs to be deleted from the AMF and an SM context needs to be deleted from the SMF.

If a terminal is normally deregistered, the MM context may be deleted from the AMF and the SM context may be deleted from the SMF before the deregistration. If the terminal is abnormally deregistered, after the terminal is deregistered, the MM context before the terminal is deregistered may still be stored in the AMF, and the SM context before the terminal is deregistered may still be stored in the SMF.

To resolve the current problem, technical solutions of the embodiments of the present application are provided, and are described below with reference to accompanying figures. An example in which the technical solutions provided in the embodiments of the present application are applied to the network architecture shown in FIG. 1 is used in the following process of description.

Figure 2:
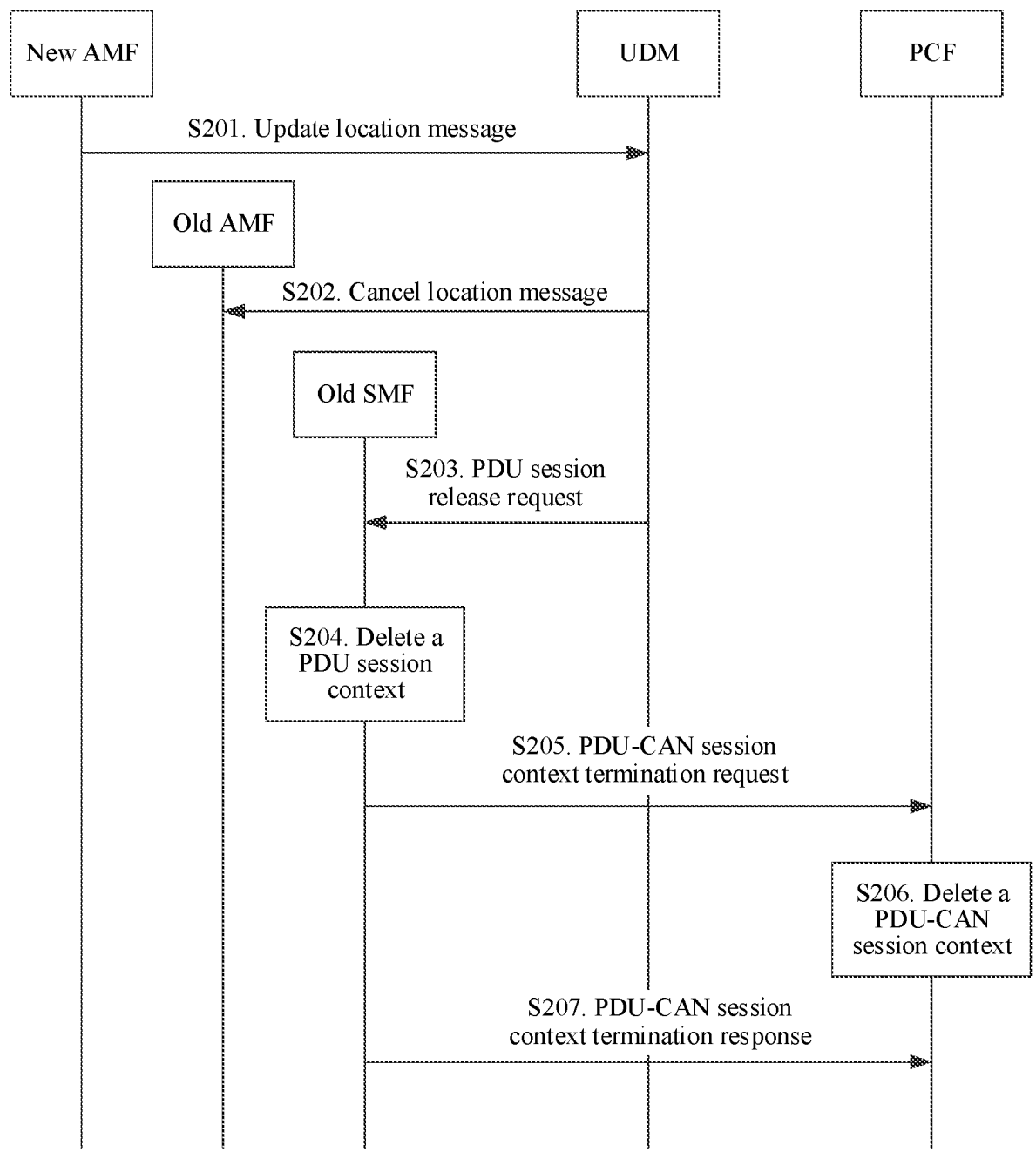
FIG. 2, FIG. 4, FIG. 7, FIG. 8, FIG. 10, FIG. 13, FIG. 15, and FIG. 16 are several flowcharts of several methods for deleting session context according to embodiments of the present application.

Referring to FIG. 2, an embodiment of the present application provides a method for deleting a session context. In the method described in this embodiment of the present application, UDM triggers an SMF to delete a session context. In this embodiment of the present application, an example in which an AMF connected to a terminal before the terminal is abnormally deregistered is different from an AMF connected to the terminal when the terminal accesses a network again after being abnormally deregistered is used. That is, the AMF changes after the terminal accesses the network again. A procedure of the method is described as follows.

After being abnormally deregistered, the terminal initiates a registration request again. A new AMF determines, based on an identifier of the terminal, that a reason for the registration request of the terminal is that the terminal is abnormally disconnected from the network without a normal deregistration procedure and has some previous packet data unit (PDU) Session information.

For example, the identifier of the terminal is an identification (ID) of the terminal. The ID of the terminal can indicate information such as an ID of an old AMF.

S201. The New AMF sends a delete request message to the UDM, where the delete request message is used to instruct the UDM to trigger releasing a PDU session context that is not deleted after the terminal is abnormally deregistered. The UDM receives the delete request message.

For example, the delete request message is implemented by using an update location message, the update location message carries a PDU session release indicator, and the PDU session release indicator is used to instruct the UDM to trigger releasing the PDU Session context.

S202. The UDM sends a cancel location message to the Old AMF. The Cancel location message is used to indicate to the Old AMF that the UDM already deletes location information of the Old AMF.

S203. The UDM sends a PDU session release request to an Old SMF, where the PDU Session release Request is used to request to delete the activated PDU Session context. The Old SMF receives the PDU Session release Request.

S204. The Old SMF deletes, based on the received PDU Session release Request, the PDU Session context that is stored in the Old SMF and that is of the terminal, that is, the PDU session context of the terminal.

The PDU Session context deleted by the Old SMF is a PDU Session context that is not deleted by the Old SMF after the terminal is abnormally deregistered. In this embodiment of the present application, only the PDU session release message needs to be sent to an SMF entity if a session context stored in the SMF entity needs to be deleted. After receiving the PDU session release message, the SMF entity may delete the PDU session context that is stored in the SMF entity and that is of the terminal before the terminal is abnormally disconnected from the network, so that the session context can be deleted from the SMF entity after the terminal is abnormally deregistered, and the terminal that accesses the network again after the abnormal deregistration can reestablish a new session context.

In this embodiment of the present application, the UDM triggers the Old SMF to delete the PDU Session context of the terminal, to resolve a problem of how to delete the PDU Session context of the terminal from the SMF after the terminal is abnormally deregistered in a relatively simple manner.

S205. The Old SMF sends a PDU-based connectivity access network session context termination request to the PCF, where the PDU-CAN termination request is used to request to delete the PDU-connectivity access network session context stored in the PCF, and PDU-CAN session context may be understood as the PDU-based connectivity access network session context. The PCF receives the PDU-CAN session Context Termination Request.

S206. The PCF deletes, based on the received PDU-CAN session Context Termination Request, the PDU-CAN session context that is stored in the PCF and that is of the terminal.

The PDU-CAN session context deleted by the PCF is a PDU-CAN session context that is not deleted by the PCF after the terminal is abnormally deregistered.

In addition to the SMF, the PCF may also store the session context of the terminal. The session context is referred to as a PDU Session context if stored in the SMF, or referred to as a PDU-CAN session context if stored in the PCF. In this embodiment of the present application, apart from deleting the PDU Session context that is stored in the Old SMF and that is of the terminal, the Old SMF further triggers the PCF to delete the PDU-CAN session context stored in the PCF. Therefore, session contexts before the terminal is abnormally deregistered may both be deleted, so that a new session context is established.

S207. The PCF sends a PDU-based connectivity access network session context termination response to the Old SMF, to notify the Old SMF that the PDU-CAN session context is already deleted. The Old SMF receives the PDU-CAN session Context Termination Response.

Figure 3A:
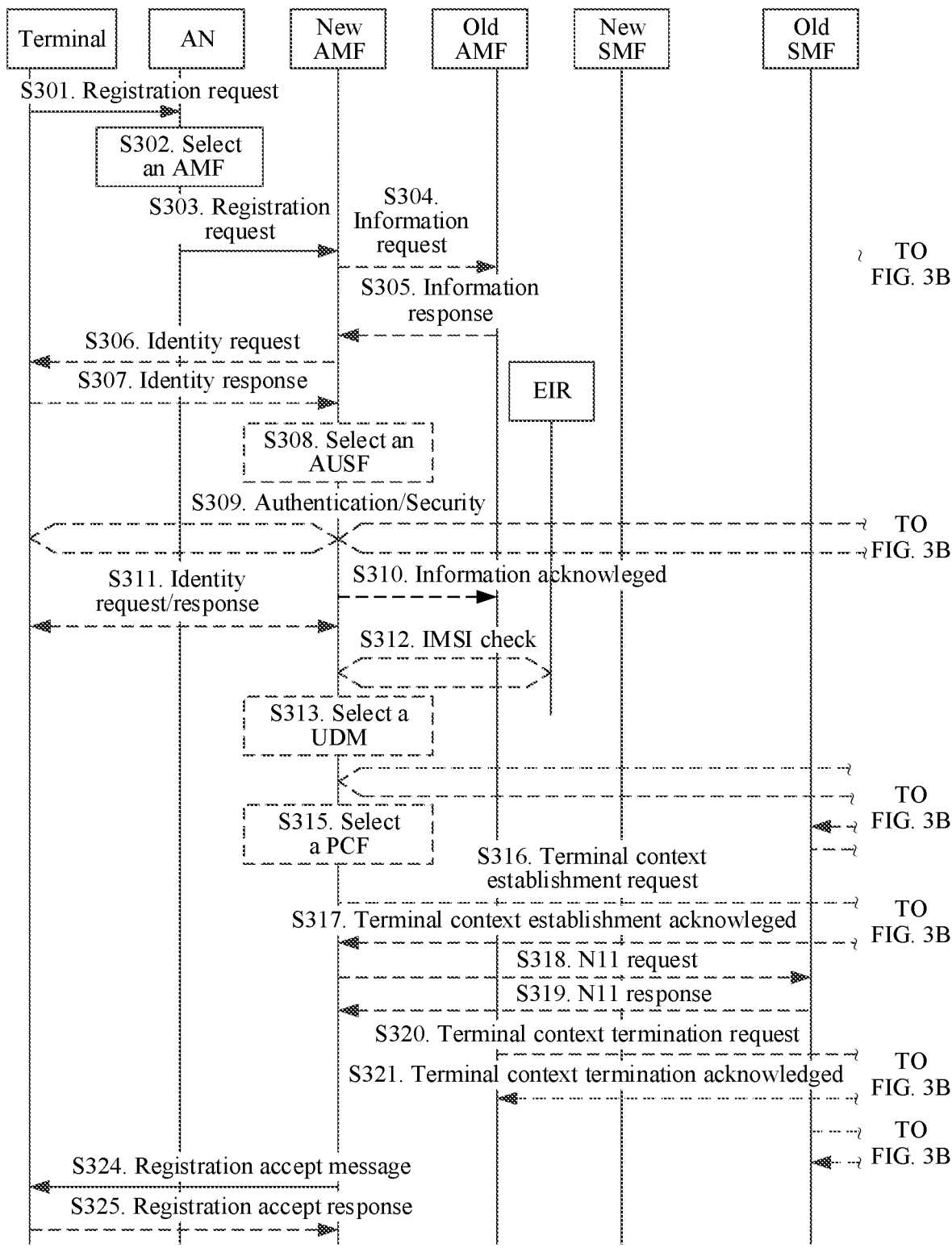
FIG. 3A and FIG. 3B, FIG. 5A and FIG. 5B, FIG. 9A and FIG. 9B, FIG. 11A and FIG. 11B, FIG. 12A and FIG. 12B, FIG. 14A and FIG. 14B, and FIG. 17A and FIG. 17B are several flowcharts of a registration procedure of a terminal according to an embodiment of the present application.
Figure 3B:
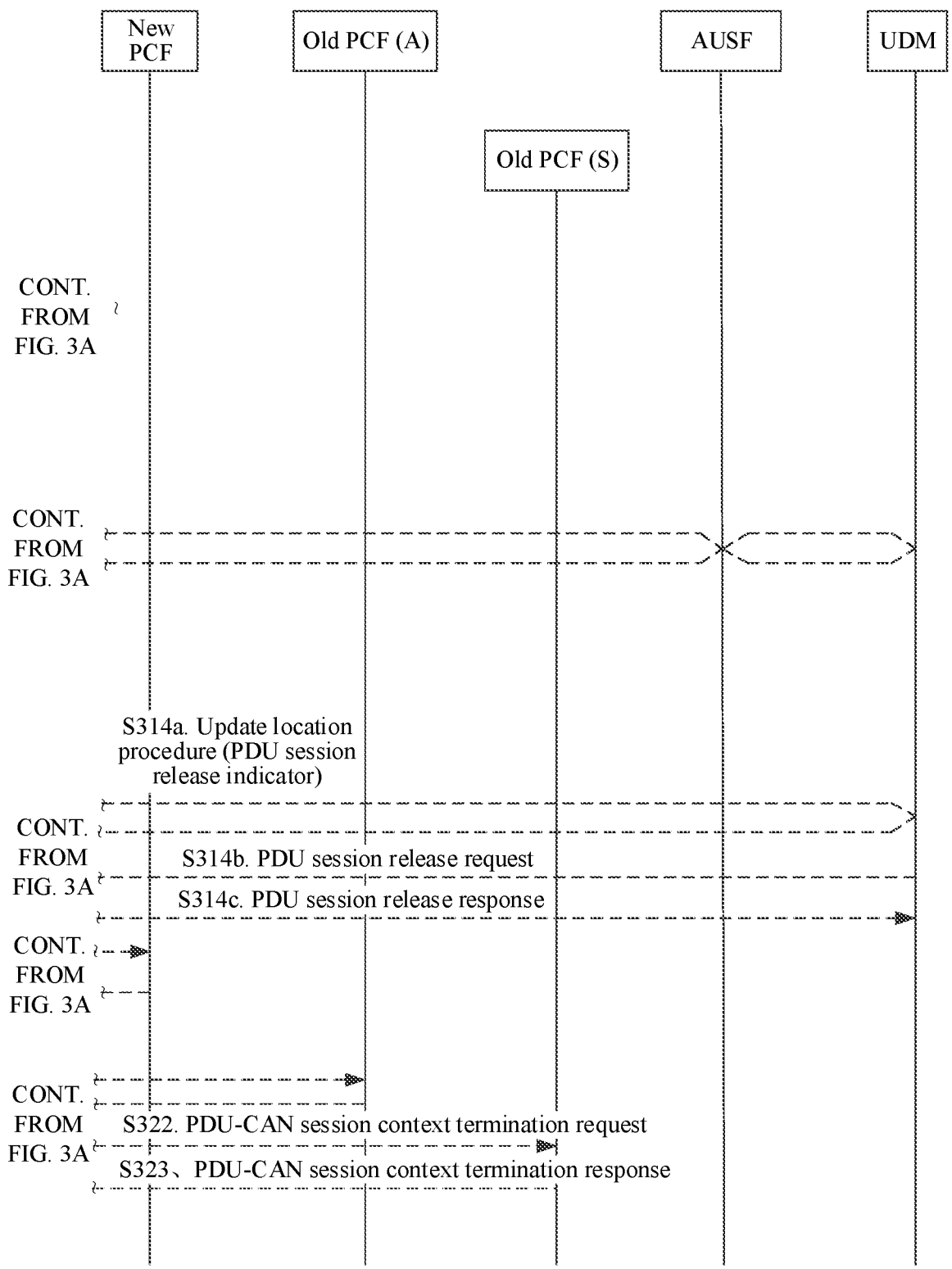

To better understand the method for deleting a session context provided in the embodiment shown in FIG. 2, the following provides another embodiment for describing a registration procedure of a terminal, to determine how the method for deleting a session context provided in the embodiment shown in FIG. 2 is performed in the registration procedure of the terminal. FIG. 3A and FIG. 3B are a flowchart of the registration procedure of the terminal.

S301. The terminal sends a registration request to an access network, and the access network receives the Registration Request.

S302. The access network selects an AMF.

S303. The access network sends the Registration Request to the selected AMF, and the selected AMF receives the Registration Request sent by the access network.

In the embodiment shown in FIG. 3A and FIG. 3B, an example in which the AMF connected to the terminal before the terminal is abnormally deregistered is different from the AMF connected to the terminal after the terminal accesses the network again after being abnormally deregistered is used. Therefore, the AMF selected by the access network in S303 is a New AMF, and the AMF connected to the terminal before the terminal is abnormally deregistered is an Old AMF.

S304. The New AMF sends, to the Old AMF, an information request that is used to request to obtain a subscriber permanent identifier (SUPI) of the terminal. The Old AMF receives the Information Request.

S305. The Old AMF sends an information response to the New AMF, and the New AMF receives the Information Response.

S306. The New AMF sends an identity request to the terminal. If the SUPI of the terminal is not obtained in S304, the Identity Request in S306 is used to continue to request to obtain the SUPI that is used to uniquely identify the terminal. The terminal receives the Identity Request.

S307. The terminal sends an identity response to the New AMF, and the New AMF receives the Identity Response.

S308. The New AMF selects an AUSF. That is, the New AMF selects a server that may be configured to perform authentication.

S309. Authentication/Security is performed between the terminal and the New AMF, between the New AMF and the selected AUSF, and between the AUSF and UDM.

S310. The New AMF sends information acknowledged to the Old AMF, to obtain acknowledged information from the Old AMF. The Old AMF receives the Information Acknowledged sent by the New AMF.

S311. An Identity Request/Response is performed between the terminal and the New AMF. In S311, ID information of the terminal is authenticated and responded.

S312. An international mobile subscriber identity (ME Identity, IMSI) check is performed between the New AMF and a mobile equipment identity register (EIR). The EIR stores an international mobile equipment identity (IMEI) of the terminal, and enables the network to have functions of preventing access by an unauthorized terminal, monitoring running of a faulty device, and guaranteeing secure running of the network by checking three tables: a white list, a black list, and a gray list.

S313. The New AMF selects the UDM.

S314a. The New AMF initiates an update location procedure to the selected UDM. In the update location procedure, the New AMF sends an update location message to the selected UDM, and adds a PDU session release indicator to the update location message. The UDM receives the update location message.

S201 in the embodiment shown in FIG. 2 may be performed in S314a.

S314b. The UDM sends a PDU Session release Request to the Old SMF, where the PDU Session release Request is used to request to delete the activated PDU Session context. The Old SMF receives the PDU Session release Request message.

The Old SMF deletes, based on the received PDU Session release Request message, the PDU Session context that is stored in the Old SMF and that is of the terminal, that is, the PDU session context of the terminal.

The PDU Session context deleted by the Old SMF is a PDU Session context that is not deleted by the Old SMF after the terminal is abnormally deregistered.

That is, S203 and S204 in the embodiment shown in FIG. 2 may be performed in S314b.

S314c. The Old SMF sends a PDU Session release Response to the UDM, to indicate that the Old SMF already deletes, based on the received PDU Session release Request message, the PDU Session context that is stored in the Old SMF and that is of the terminal. The UDM receives the PDU Session release Response.

S314a, S314b, and S314c are all performed in the update location procedure initiated by the New AMF.

S315. The New AMF selects a PCF.

S316. The New AMF sends, to the selected PCF, a terminal context establishment request that is used to request the PCF to establish a context of the terminal. The selected PCF receives the Terminal Context Establishment Request. For example, the selected PCF is a New PCF.

S317. After establishing the context of the terminal, the New PCF sends a terminal context establishment acknowledged to the New AMF, and the New AMF receives the Terminal Context Establishment Acknowledged.

S318. The New AMF sends, to the Old SMF, an N11 Request that is used to interact session information. The Old SMF receives the N11 Request.

S319. The Old SMF sends an N11 Response to the New AMF.

S320. The Old AMF sends, to an Old PCF corresponding to the AMF, a terminal context termination request that is used to delete a terminal context in the PCF corresponding to the AMF. The Old PCF receives the Terminal Context Termination Request sent by the Old AMF.

In FIG. 3A and FIG. 3B, the Old PCF corresponding to the AMF is denoted as an Old PCF (A).

S321. The Old PCF corresponding to the AMF sends a terminal context termination acknowledged to the Old AMF. The Old AMF receives the Terminal Context Termination Acknowledged sent by the Old PCF corresponding to the AMF.

S322. The Old SMF sends a PDU-CAN session Context Termination Request to an Old PCF corresponding to an SMF, where the PDU-CAN session Context Termination Request is used to request to delete a PDU-CAN session context stored in the PCF. The Old PCF corresponding to the SMF receives the PDU-CAN session Context Termination Request.

In FIG. 3A and FIG. 3B, the Old PCF corresponding to the SMF is denoted as an Old PCF (S).

The Old PCF corresponding to the SMF deletes, based on the received PDU-CAN session Context Termination Request, the PDU-CAN session context that is stored in the Old PCF and that is of the terminal.

The PDU-CAN session context deleted by the Old PCF corresponding to the SMF is a PDU-CAN session context that is not deleted by the Old PCF corresponding to the SMF after the terminal is abnormally deregistered.

That is, S205 and S206 in the embodiment shown in FIG. 2 may be performed in S322.

S323. The Old PCF corresponding to the SMF sends a PDU-CAN session Context Termination Response to the Old SMF, to notify the Old SMF that the PDU-CAN session context is already deleted. The Old SMF receives the PDU-CAN session Context Termination Response.

That is, S207 in the embodiment shown in FIG. 2 may be performed in S323.

S324. The New AMF sends, to the terminal, a registration accept message that is used to indicate that registration of the terminal already succeeds. The terminal receives the Registration Accept message.

S325. The terminal sends a registration complete message to the New AMF, and the New AMF receives the Registration Complete message. Until now, the registration procedure of the terminal is completed.

Figure 4:
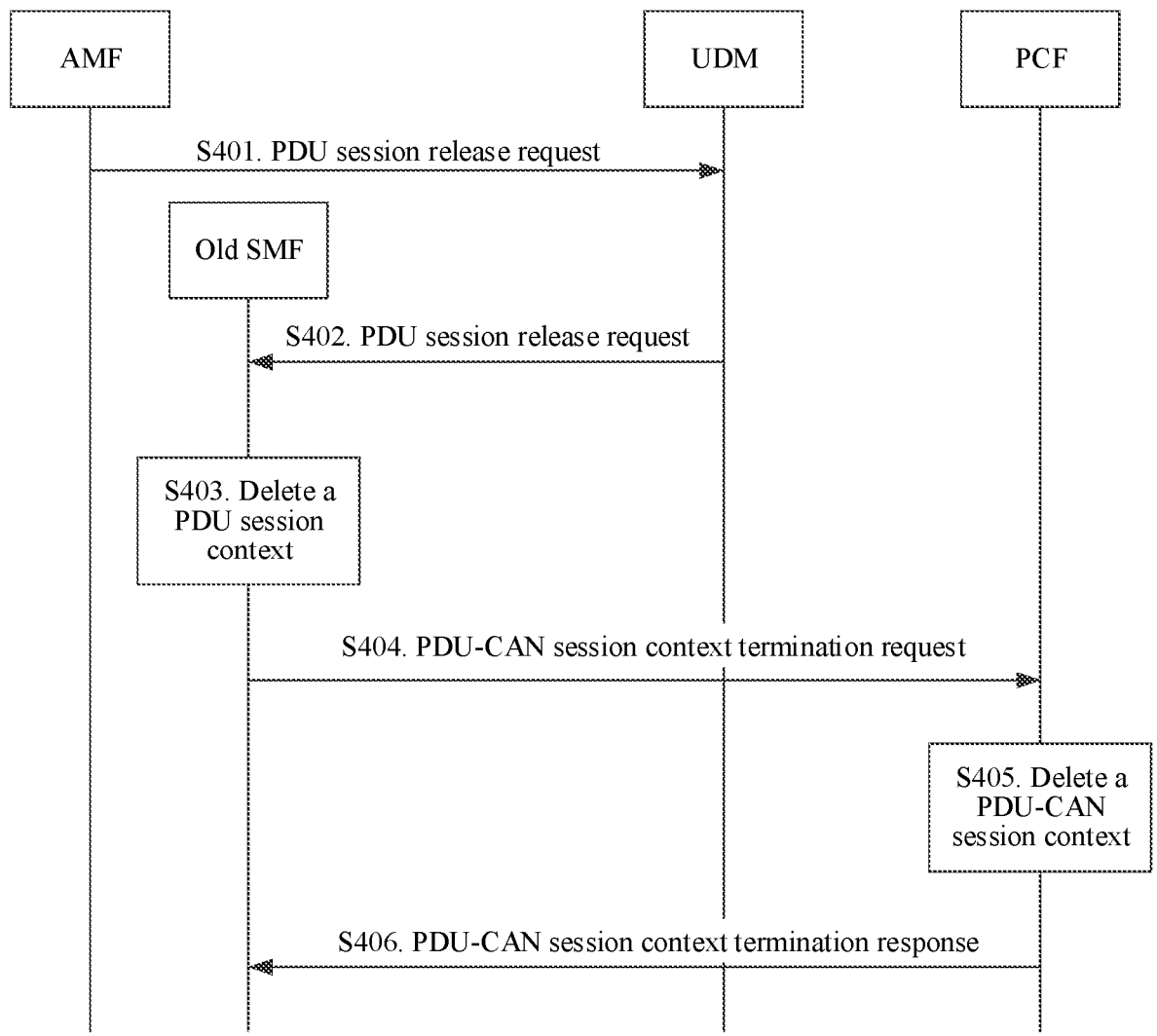

In the embodiments shown in FIG. 2 and FIG. 3A and FIG. 3B, an example in which the AMF connected to the terminal before the terminal is abnormally deregistered is different from the AMF connected to the terminal after the terminal accesses the network again after being abnormally deregistered is used. That is, the AMF changes after the terminal accesses the network again. The following describes another embodiment. In this embodiment, an example in which the AMF connected to the terminal before the terminal is abnormally deregistered is the same as the AMF connected to the terminal after the terminal accesses the network again after being abnormally deregistered is used. That is, the AMF does not change after the terminal accesses the network again. FIG. 4 describes an implementation procedure of this embodiment.

After being abnormally deregistered, the terminal initiates a registration request again. A new AMF determines, based on an identifier of the terminal, that a reason for the registration request of the terminal is that the terminal is abnormally disconnected from the network without a normal deregistration procedure and has some previous packet data unit (PDU) Session information.

For example, the identifier of the terminal is an ID of the terminal. The ID of the terminal can indicate information such as an ID of an old AMF, and the like.

S401. The AMF sends a delete request message to a UDM, where the delete request message is used to instruct the UDM to trigger releasing a PDU session context that is not deleted after the terminal is abnormally deregistered. The UDM receives the delete request message.

For example, the delete request message is implemented through a PDU Session release Request, and is used to request the UDM to trigger an SMF to delete the PDU Session context.

S402. The UDM sends the PDU Session release Request to an Old SMF, where the PDU Session release Request is used to request the Old SMF to delete the activated PDU Session context. The Old SMF receives the PDU Session release Request.

S403. The Old SMF deletes, based on the received PDU Session release Request, the PDU Session context that is stored in the Old SMF and that is of the terminal, that is, the PDU session context of the terminal.

The PDU Session context deleted by the Old SMF is a PDU Session context that is not deleted by the Old SMF after the terminal is abnormally deregistered. In this embodiment of the present application, the UDM triggers the Old SMF to delete the PDU Session context of the terminal, to resolve a problem of how to delete the PDU Session context of the terminal from the SMF after the terminal is abnormally deregistered in a relatively simple manner.

S404. The Old SMF sends a PDU-CAN session Context Termination Request to a PCF, where the PDU-CAN session Context Termination Request is used to request to delete a PDU-CAN session context stored in the PCF. The PCF receives the PDU-CAN session Context Termination Request.

S405. The PCF deletes, based on the received PDU-CAN session Context Termination Request, the PDU-CAN session context that is stored in the PCF and that is of the terminal.

The PDU-CAN session context deleted by the PCF is a PDU-CAN session context that is not deleted by the PCF after the terminal is abnormally deregistered.

In this embodiment of the present application, apart from deleting the PDU Session context that is stored in the Old SMF and that is of the terminal, the Old SMF further triggers the PCF to delete the PDU-CAN session context stored in the PCF. Therefore, session contexts before the terminal is abnormally deregistered may both be deleted, so that a new session context is established.

S406. The PCF sends a PDU-CAN session Context Termination Response to the Old SMF, to notify the Old SMF that the PDU-CAN session context is already deleted. The Old SMF receives the PDU-CAN session Context Termination Response.

It can be seen that regardless of whether the AMF changes after the terminal is abnormal deregistered, in this embodiment of the present application, the UDM may trigger and enable the SMF to delete the session context before the terminal is abnormally deregistered.

Figure 5A:
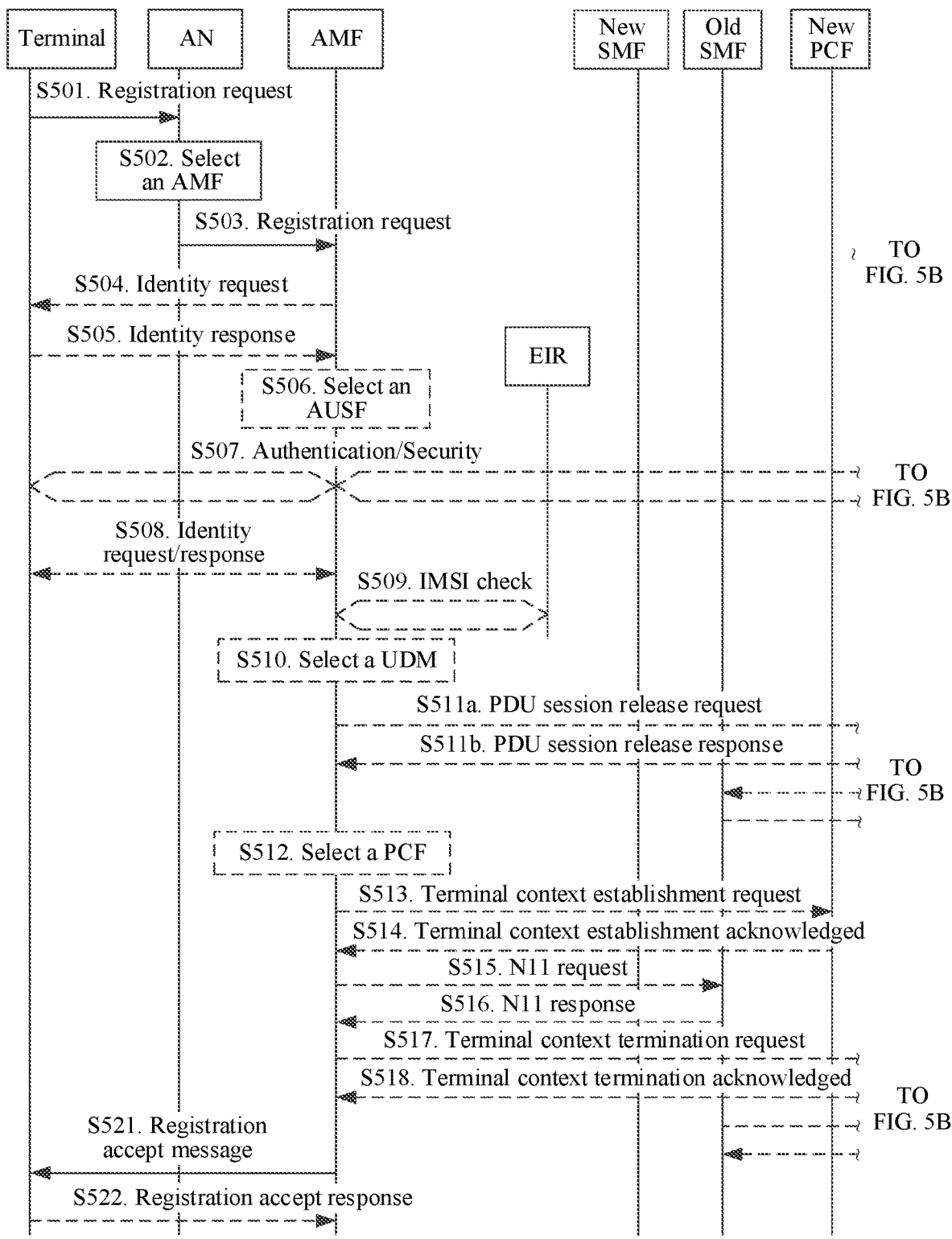
Figure 5B:
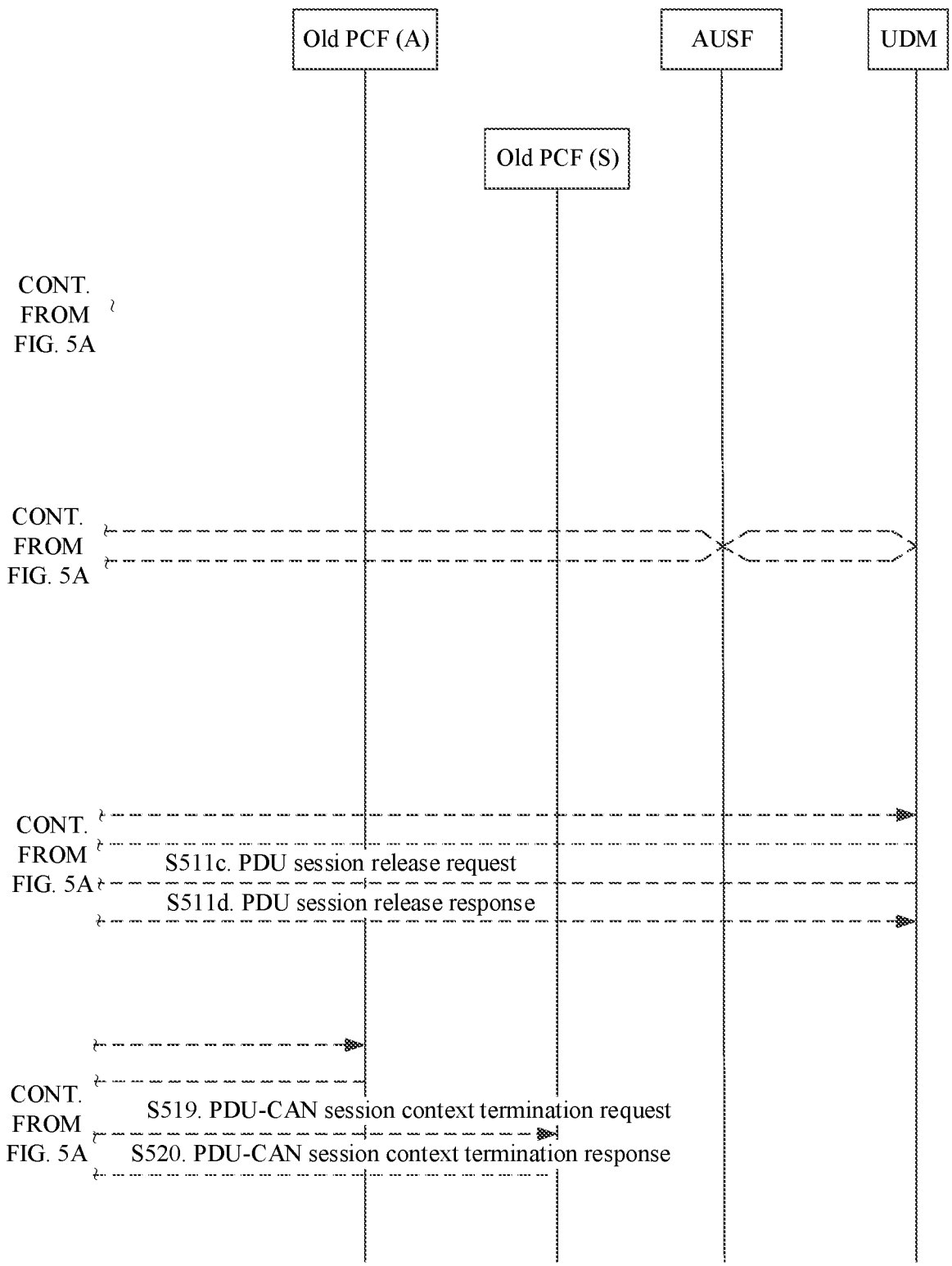

To better understand the method for deleting a session context in the embodiment shown in FIG. 4, the following provides another embodiment for describing a registration procedure of a terminal, to determine how the method for deleting a session context provided in the embodiment shown in FIG. 4 is performed in the registration procedure of the terminal. FIG. 5A and FIG. 5B are a flowchart of the registration procedure of the terminal.

S501. The terminal sends a Registration Request to an access network, and the access network receives the Registration Request.

S502. The access network selects an AMF.

S503. The access network sends the Registration Request to the selected AMF, and the selected AMF receives the Registration Request sent by the access network.

In the embodiment shown in FIG. 5A and FIG. 5B, an example in which the AMF connected to the terminal before the terminal is abnormally deregistered is the same as the AMF connected to the terminal after the terminal accesses the network again after being abnormally deregistered is used. Therefore, there is only one AMF in FIG. 5A and FIG. 5B.

S504. The AMF sends, to the terminal, an Identity Request that is used to request to obtain an SUPI of the terminal. The terminal receives the Identity Request.

S505. The terminal sends an Identity Response to the AMF, and the AMF receives the Identity Response.

S506. The AMF selects an AUSF.

S507. Authentication/Security is performed between the terminal and the AMF, between the AMF and the selected AUSF, and between the AUSF and a UDM.

S508. An Identity Request/Response is performed between the terminal and the AMF.

S509. An ME Identity check is performed between the AMF and an EIR, to prevent access by an unauthorized terminal.

S510. The AMF selects the UDM.

S511a. The AMF sends, to the selected UDM, a PDU Session release Request that is used to request to delete an activated PDU Session context. The UDM receives the PDU Session release Request.

S401 in the embodiment shown in FIG. 4 may be performed in S511a.

S511b. The UDM sends, to the AMF, a PDU Session release Response that is used to notify the AMF that the PDU Session context before the terminal is abnormally deregistered is already deleted. The AMF receives the PDU Session release Response.

S511c. The UDM sends a PDU Session release Request to the Old SMF, where the PDU Session release Request is used to request to delete the activated PDU Session context. The Old SMF receives the PDU Session release Request message.

The Old SMF deletes, based on the received PDU Session release Request message, the PDU Session context that is stored in the Old SMF and that is of the terminal, that is, the PDU session context of the terminal.

The PDU Session deleted by the Old SMF is a PDU Session context that is not deleted by the Old SMF after the terminal is abnormally deregistered.

That is, S402 and S403 in the embodiment shown in FIG. 4 may be performed in S314b.

S511d. The Old SMF sends a PDU Session release Response to the UDM, to indicate that the Old SMF already deletes, based on the received PDU Session release Request message, the PDU Session context that is stored in the Old SMF and that is of the terminal. The UDM receives the PDU Session release Response.

S511a, S511b, S511c, and S511d are all performed in an update location procedure initiated by the AMF.

S512. The AMF selects a PCF.

S513. The AMF sends, to the selected PCF, a Terminal Context Establishment Request that is used to request the PCF to establish a context of the terminal. The selected PCF receives the Terminal Context Establishment Request. For example, the selected PCF is a New PCF.

S514. After establishing the context of the terminal, the New PCF sends a Terminal Context Establishment Acknowledged to the AMF, and the AMF receives the Terminal Context Establishment Acknowledged.

S515. The AMF sends, to the Old SMF, an N11 Request that is used to interact session information. The Old SMF receives the N11 Request.

S516. The Old SMF sends an N11 Response to the New AMF.

S517. The AMF sends, to an Old PCF corresponding to the AMF, a Terminal Context Termination Request that is used to delete a terminal context in the PCF corresponding to the AMF. The Old PCF receives the Terminal Context Termination Request sent by the AMF.

In FIG. 5A and FIG. 5B, the Old PCF corresponding to the AMF is denoted as an Old PCF (A).

S518. The Old PCF corresponding to the AMF sends a Terminal Context Termination Acknowledged to the AMF, and the AMF receives the Terminal Context Termination Acknowledged sent by the Old PCF corresponding to the AMF.

S519. The Old SMF sends a PDU-CAN session Context Termination Request to an Old PCF corresponding to an SMF, where the PDU-CAN session Context Termination Request is used to request to delete a PDU-CAN session context stored in the PCF. The Old PCF corresponding to the SMF receives the PDU-CAN session Context Termination Request.

In FIG. 5A and FIG. 5B, the Old PCF corresponding to the SMF is denoted as an Old PCF (S).

The Old PCF corresponding to the SMF deletes, based on the received PDU-CAN session Context Termination Request, the PDU-CAN session context that is stored in the Old PCF and that is of the terminal.

The PDU-CAN session context deleted by the Old PCF corresponding to the SMF is a PDU-CAN session context that is not deleted by the Old PCF corresponding to the SMF after the terminal is abnormally deregistered.

That is, S404 and S405 in the embodiment shown in FIG. 4 may be performed in S519.

S520. The Old PCF corresponding to the SMF sends a PDU-CAN session Context Termination Response to the Old SMF, to notify the Old SMF that the PDU-CAN session context is already deleted. The Old SMF receives the PDU-CAN session Context Termination Response.

That is, S406 in the embodiment shown in FIG. 4 may be performed in S520.

S521. The AMF sends, to the terminal, a Registration Accept message that is used to indicate that registration of the terminal already succeeds. The terminal receives the Registration Accept message.

S522. The terminal sends a Registration Complete message to the AMF, and the AMF receives the Registration Complete message. Until now, the registration procedure of the terminal is completed.

Figure 6:
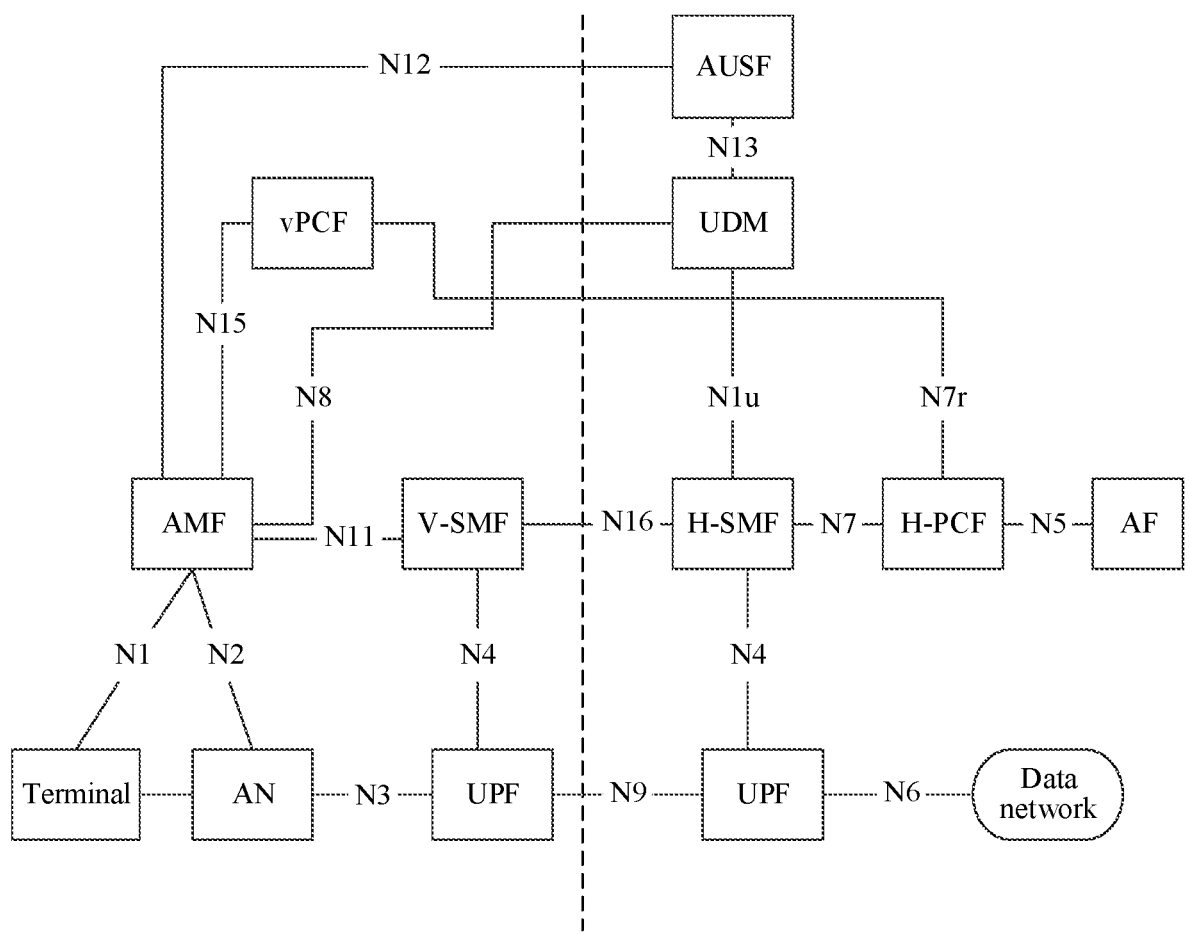
FIG. 6 is a schematic diagram of a scenario in which a terminal roams according to an embodiment of the present application.

In the foregoing embodiment described above, the terminal is always in a coverage of a same operator before and after the abnormal deregistration. If the terminal roams, for example, from a coverage of an operator A to a coverage of an operator B, and is abnormally deregistered after the terminal accesses the network provided by the operator B, in this case, deleting, from an SMF provided by the operator B, a PDU session context before the terminal is abnormally deregistered needs to be considered. FIG. 6 is a schematic diagram of a scenario in which a terminal roams. In FIG. 6, a range of the operator A, that is, a network accessed by the terminal before the terminal roams is on the right side of a dashed line, and a range of the operator B, that is, a network accessed by the terminal after the terminal roams is on the left side of the dashed line. A home (H)-SMF represents an SMF provided by the operator A, an H-PCF represents a PCF provided by the operator A, a visit (V)-SMF represents an SMF provided by the operator B, and a V-PCF represents a PCF provided by the operator B. The terminal originally accesses the network provided by the operator A, that is, a network on the right side of the dashed line, and then the terminal roams and accesses the network provided by the operator B. After accessing the network provided by the operator B, the terminal is abnormally deregistered. Therefore, deleting, from the network provided by the operator B, the session context before the terminal is abnormally deregistered needs to be considered.

Figure 7:
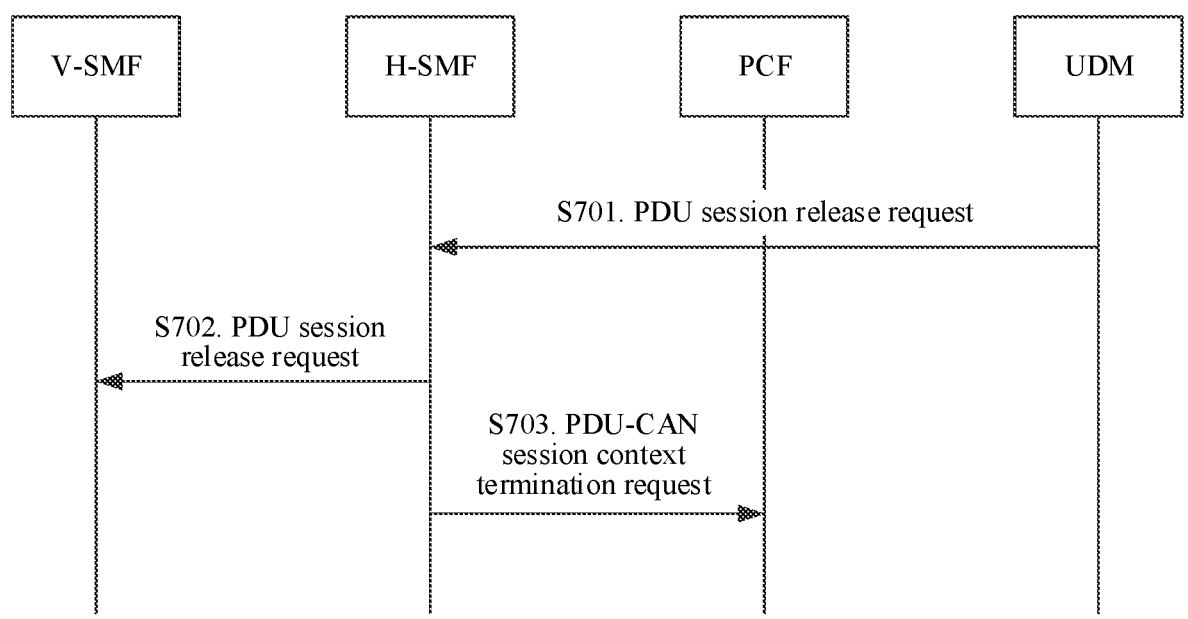

The following provides an embodiment that is used to resolve the problem. Referring to FIG. 7, a procedure of this embodiment is described as follows.

S701. A UDM sends, to an H-SMF, a PDU Session release Request that is used to request the H-SMF to delete an activated PDU Session context before a terminal is abnormally deregistered. The H-SMF receives the PDU Session release Request sent by the UDM.

After receiving the PDU Session release Request, the H-SMF may delete the PDU Session context that is stored in the H-SMF and that is of the terminal before the terminal is abnormally deregistered.

S702. The H-SMF sends, to a V-SMF, the PDU Session release Request that is used to request to delete the activated PDU Session context before the terminal is abnormally deregistered. The V-SMF receives the PDU Session release Request sent by the H-SMF.

After receiving the PDU Session release Request, the V-SMF may delete the PDU Session context that is stored in the V-SMF and that is of the terminal before the terminal is abnormally deregistered.

S703. The H-SMF sends, to an H-PCF, a PDU-CAN session Context Termination Request that is used to request to delete an activated PDU-CAN session context before the terminal is abnormally deregistered. The H-PCF receives the PDU-CAN session Context Termination Request sent by the H-SMF.

After receiving the PDU-CAN session Context Termination Request, the H-PCF may delete the PDU-CAN session context that is stored in the H-PCF and that is of the terminal before the terminal is abnormally deregistered.

It can be seen that in this embodiment of the present application, the UDM triggers and enables the H-SMF to delete the activated PDU Session context, and by using the H-SMF, the V-SMF may further be enabled to delete the activated PDU Session context and the H-PCF may further be enabled to delete the activated PDU-CAN session context.

Figure 8:
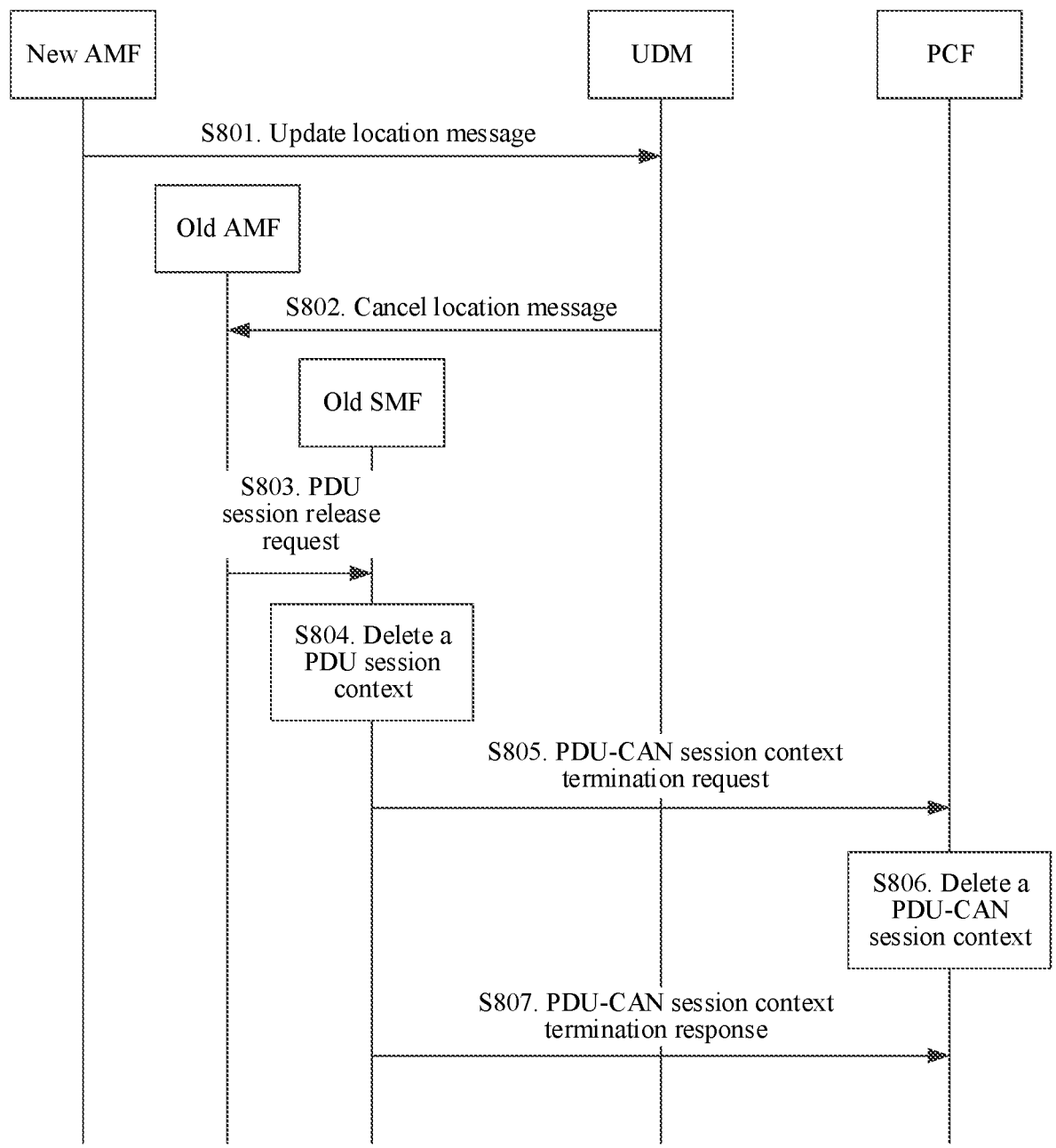

In the foregoing embodiment described above, the UDM triggers the SMF to delete the activated PDU Session context, and this is only one implementation of enabling the SMF to delete the activated PDU Session context. The following describes another embodiment. In the embodiment described below, an AMF triggers an SMF to delete an activated PDU Session context. FIG. 8 shows an implementation procedure of this embodiment. In this embodiment of the present application, an example in which the AMF connected to the terminal before the terminal is abnormally deregistered is different from the AMF connected to the terminal after the terminal accesses the network again after being abnormally deregistered is used. That is, the AMF changes after the terminal accesses the network again. The AMF before the terminal is abnormally deregistered is an Old AMF, and the AMF after the terminal accesses the network again is a New AMF.

S801. The New AMF sends an update location message to a UDM, and the UDM receives the update location message.

S802. The UDM sends, to the Old AMF, a delete request message that is used to instruct the Old AMF to trigger releasing a PDU session context that is not deleted after the terminal is abnormally deregistered. The Old AMF receives the delete request message.

For example, the delete request message is implemented by using a Cancel location message. Apart from being used to notify the Old AMF to delete the location, the Cancel location message may be further used to instruct the Old AMF to trigger releasing the PDU session context that is not deleted after the terminal is abnormally deregistered.

S803. The Old AMF sends, to an Old SMF, a PDU Session release Request that is used to request to delete the activated PDU Session context. The Old SMF receives the PDU Session release Request sent by the Old AMF.

S804. The Old SMF deletes, based on the received PDU Session release Request, the stored PDU Session context before the terminal is abnormally deregistered.

In this embodiment of the present application, the SMF may be triggered by the AMF to delete the PDU Session context before the terminal is abnormally deregistered. The UDM does not need to be used. The manner is simpler and more direct.

S805. The Old SMF sends, to a PCF, a PDU-CAN session Context Termination Request that is used to request to delete a PDU-CAN session context stored in the PCF. The PCF receives the PDU-CAN session Context Termination Request sent by the Old SMF.

S806. The PCF deletes the PDU-CAN session context based on the received PDU-CAN session Context Termination Request.

S807. The PCF sends a PDU-CAN session Context Termination Response to the Old SMF, to notify the Old SMF that the PDU-CAN session context that is stored in the PCF and that is of the terminal before the terminal is abnormally deregistered is already deleted. The Old SMF receives the PDU-CAN session Context Termination Response.

Figure 9A:
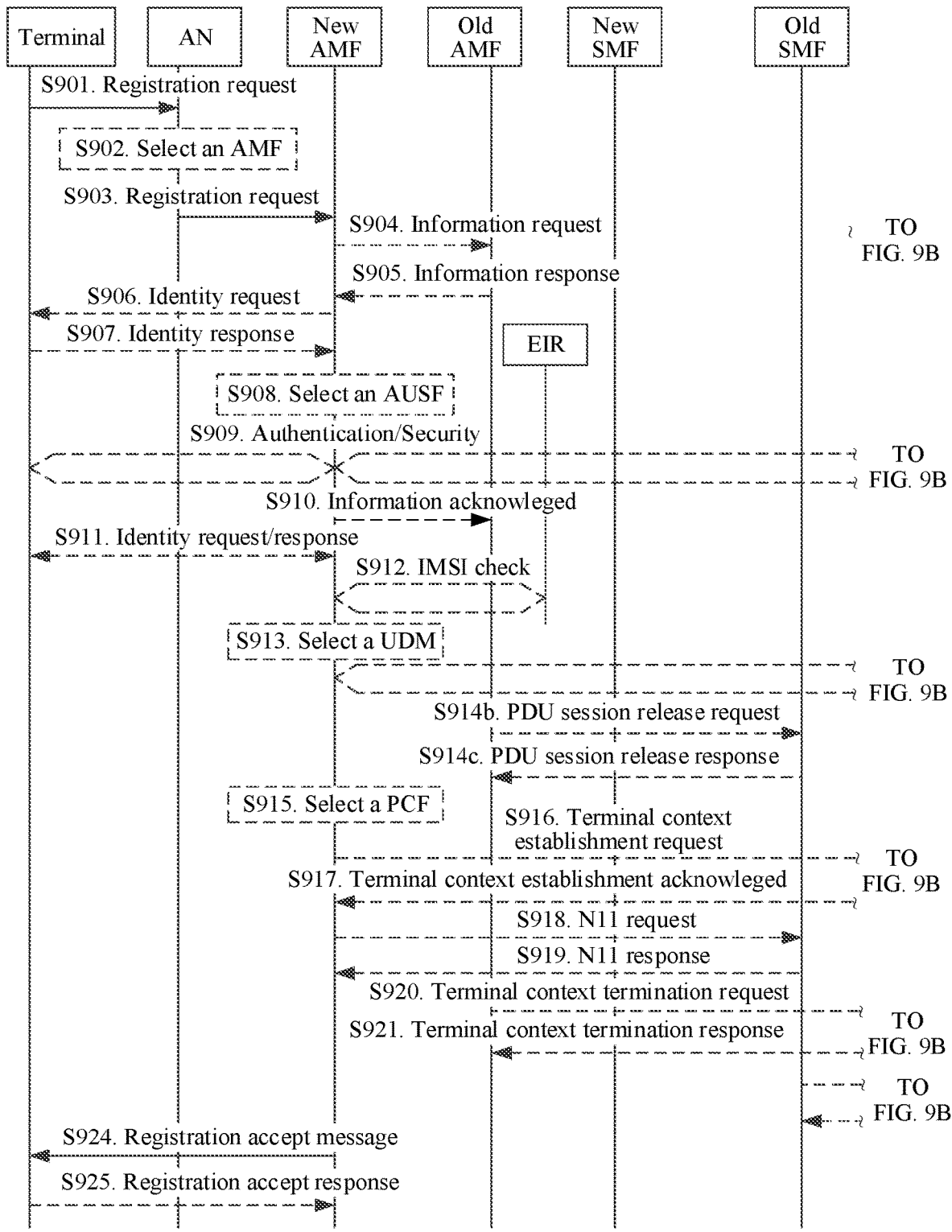
Figure 9B:
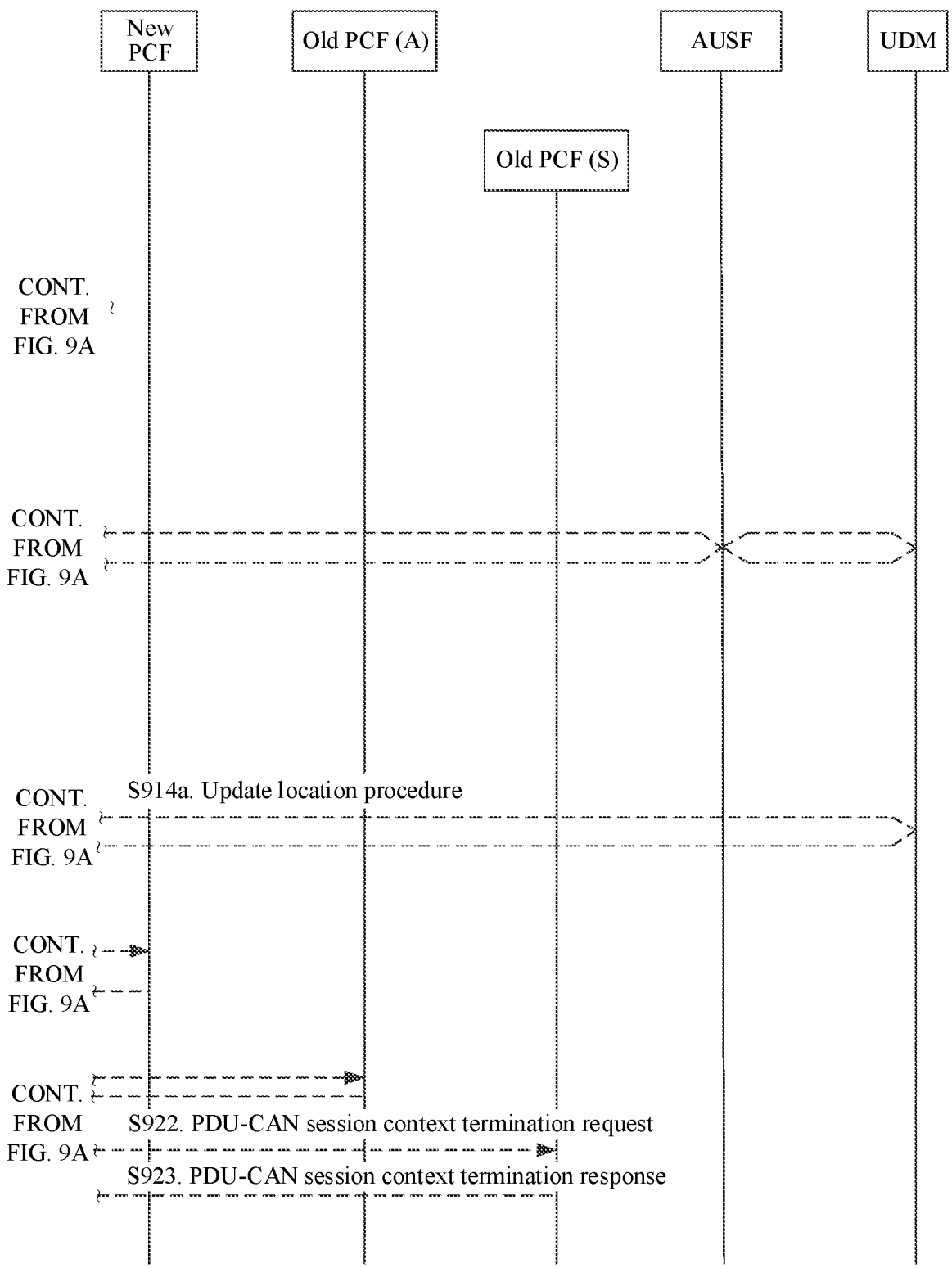

To better understand the method for deleting a session context provided in the embodiment shown in FIG. 8, the following provides another embodiment for describing a registration procedure of a terminal, to determine how the method for deleting a session context provided in the embodiment shown in FIG. 8 is performed in the registration procedure of the terminal. FIG. 9A and FIG. 9B are a flowchart of the registration procedure of the terminal.

S901. The terminal sends a Registration Request to an access network, and the access network receives the Registration Request.

S902. The access network selects an AMF.

S903. The access network sends the Registration Request to the selected AMF, and the selected AMF receives the Registration Request sent by the access network.

In the embodiment shown in FIG. 9A and FIG. 9B, an example in which the AMF connected to the terminal before the terminal is abnormally deregistered is different from the AMF connected to the terminal after the terminal accesses the network again after being abnormally deregistered is used. Therefore, the AMF selected by the access network in S903 is a New AMF, and the AMF connected to the terminal before the terminal is abnormally deregistered is an Old AMF.

S904. The New AMF sends, to the Old AMF, an Information Request that is used to request to obtain an SUPI of the terminal. The Old AMF receives the Information Request.

S905. The Old AMF sends an Information Response to the New AMF, and the New AMF receives the Information Response.

S906. The New AMF sends an Identity Request to the terminal. If the SUPI of the terminal is not obtained in S904, the Identity Request in S906 is used to continue to request to obtain the SUPI that is used to uniquely identify the terminal. The terminal receives the Identity Request.

S907. The terminal sends an Identity Response to the New AMF, and the New AMF receives the Identity Response.

S908. The New AMF selects an AUSF.

S909. Authentication/Security is performed between the terminal and the New AMF, between the New AMF and the selected AUSF, and between the AUSF and a UDM.

S910. The New AMF sends Information Acknowledged to the Old AMF, to obtain acknowledged information from the Old AMF. The Old AMF receives the Information Acknowledged sent by the New AMF.

S911. An Identity Request/Response is performed between the terminal and the New AMF.

S912. An ME Identity check is performed between the New AMF and an EIR, to prevent access by an unauthorized terminal.

S913. The New AMF selects the UDM.

S914a. The New AMF initiates an Update Location Procedure to the selected UDM.

The UDM sends, to the Old AMF, a delete request message that is used to instruct the Old AMF to trigger releasing a PDU session context that is not deleted after the terminal is abnormally deregistered. The Old AMF receives the delete request message.

For example, the delete request message is implemented by using a Cancel location message. Apart from being used to notify the Old AMF to delete the location, the Cancel location message may be further used to instruct the Old AMF to trigger releasing the PDU session context that is not deleted after the terminal is abnormally deregistered.

S914b. The Old AMF sends a PDU Session release Request to the Old SMF, where the PDU Session release Request is used to request to delete the activated PDU Session context. The Old SMF receives the PDU Session release Request.

The Old SMF deletes, based on the received PDU Session release Request message, the PDU Session context that is stored in the Old SMF and that is of the terminal, that is, the PDU session context of the terminal.

The PDU Session deleted by the Old SMF is a PDU Session context that is not deleted by the Old SMF after the terminal is abnormally deregistered.

That is, S803 and S804 in the embodiment shown in FIG. 8 may be performed in S914b.

S914c. The Old SMF sends a PDU Session release Response to the Old AMF, to indicate that the Old SMF already deletes, based on the received PDU Session release Request message, the PDU Session context that is stored in the Old SMF and that is of the terminal. The UDM receives the PDU Session release Response.

S914a, S914b, and S914c are all performed in an update location procedure initiated by the New AMF.

S915. The New AMF selects a PCF.

S916. The New AMF sends, to the selected PCF, a Terminal Context Establishment Request that is used to request the PCF to establish a context of the terminal. The selected PCF receives the Terminal Context Establishment Request. For example, the selected PCF is a New PCF.

S917. After establishing the context of the terminal, the New PCF sends a Terminal Context Establishment Acknowledged to the New AMF. The New AMF receives the Terminal Context Establishment Acknowledged.

S918. The New AMF sends, to the Old SMF, an N11 Request that is used to interact session information. The Old SMF receives the N11 Request.

S919. The Old SMF sends an N11 Response to the New AMF.

S920. The Old AMF sends, to an Old PCF corresponding to the AMF, a Terminal Context Termination Request that is used to delete a terminal context in the PCF corresponding to the AMF. The Old PCF receives the Terminal Context Termination Request sent by the Old AMF.

In FIG. 9A and FIG. 9B, the Old PCF corresponding to the AMF is denoted as an Old PCF (A).

S921. The Old PCF corresponding to the AMF sends a Terminal Context Termination Acknowledged to the Old AMF, and the Old AMF receives the Terminal Context Termination Acknowledged sent by the Old PCF corresponding to the AMF.

S922. The Old SMF sends a PDU-CAN session Context Termination Request to an Old PCF corresponding to an SMF, where the PDU-CAN session Context Termination Request is used to request to delete a PDU-CAN session context stored in the PCF. The Old PCF corresponding to the SMF receives the PDU-CAN session Context Termination Request.

In FIG. 9A and FIG. 9B, the Old PCF corresponding to the SMF is denoted as an Old PCF (S).

The Old PCF corresponding to the SMF deletes, based on the received PDU-CAN session Context Termination Request, the PDU-CAN session context that is stored in the Old PCF and that is of the terminal.

The PDU-CAN session context deleted by the Old PCF corresponding to the SMF is a PDU-CAN session context that is not deleted by the Old PCF corresponding to the SMF after the terminal is abnormally deregistered.

That is, S805 and S806 in the embodiment shown in FIG. 8 may be performed in S922.

S923. The Old PCF corresponding to the SMF sends a PDU-CAN session Context Termination Response to the Old SMF, to notify the Old SMF that the PDU-CAN session context is already deleted. The Old SMF receives the PDU-CAN session Context Termination Response.

That is, S807 in the embodiment shown in FIG. 8 may be performed in S923.

S924. The New AMF sends, to the terminal, a Registration Accept message that is used to indicate that registration of the terminal already succeeds. The terminal receives the Registration Accept message.

S925. The terminal sends a Registration Complete message to the New AMF, and the New AMF receives the Registration Complete message. Until now, the registration procedure of the terminal is completed.

Figure 10:
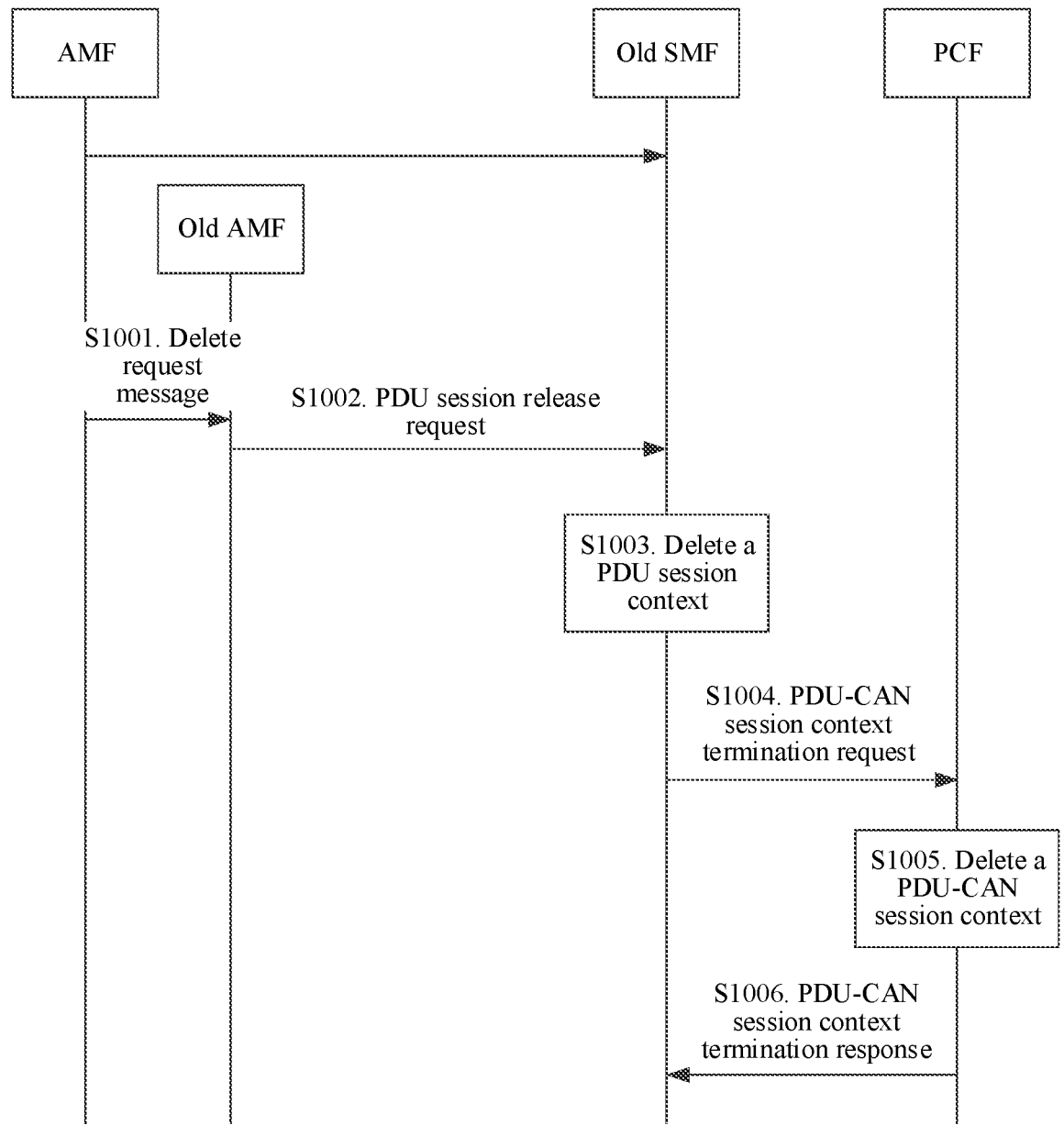

In the embodiments shown in FIG. 8 and FIG. 9A and FIG. 9B, the UDM is still used. The following describes another embodiment. In this embodiment, the AMF is still used to trigger the SMF to delete the activated PDU Session context without using the UDM. FIG. 10 shows an implementation procedure of this embodiment. In this embodiment of the present application, an example in which an AMF connected to the terminal before the terminal is abnormally deregistered is different from an AMF connected to the terminal after the terminal accesses the network again after being abnormally deregistered is still used. That is, the AMF changes after the terminal accesses the network again. The AMF before the terminal is abnormally deregistered is an Old AMF, and the AMF after the terminal accesses the network again is a New AMF.

S1001. The New AMF sends, to the Old AMF, a delete request message that is used to instruct the Old AMF to trigger releasing a PDU session context that is not deleted after the terminal is abnormally deregistered. The Old AMF receives the delete request message.

For example, the delete request message is implemented by using a session context delete indicator or a session context delete request. If the delete request message is implemented by using a session context delete indicator, the session context delete indicator may be carried in another message and sent to the Old AMF.

S1002. The Old AMF sends, to an Old SMF, a PDU Session release Request that is used to request to delete the activated PDU Session context. The Old SMF receives the PDU Session release Request.

S1003. The Old SMF deletes the PDU Session context based on the received PDU Session release Request.

S1004. The Old SMF sends, to a PCF, a PDU-CAN session Context Termination Request that is used to request to delete a PDU-CAN session context in the PCF. The PCF receives the PDU-CAN session Context Termination Request.

S1005. The PCF deletes, based on the received PDU-CAN session Context Termination Request, the PDU-CAN session context that is stored in the PCF and that is of the terminal.

S1006. The PCF sends a PDU-CAN session Context Termination Response to the Old SMF, and the Old SMF receives the PDU-CAN session Context Termination Response.

Figure 11A:
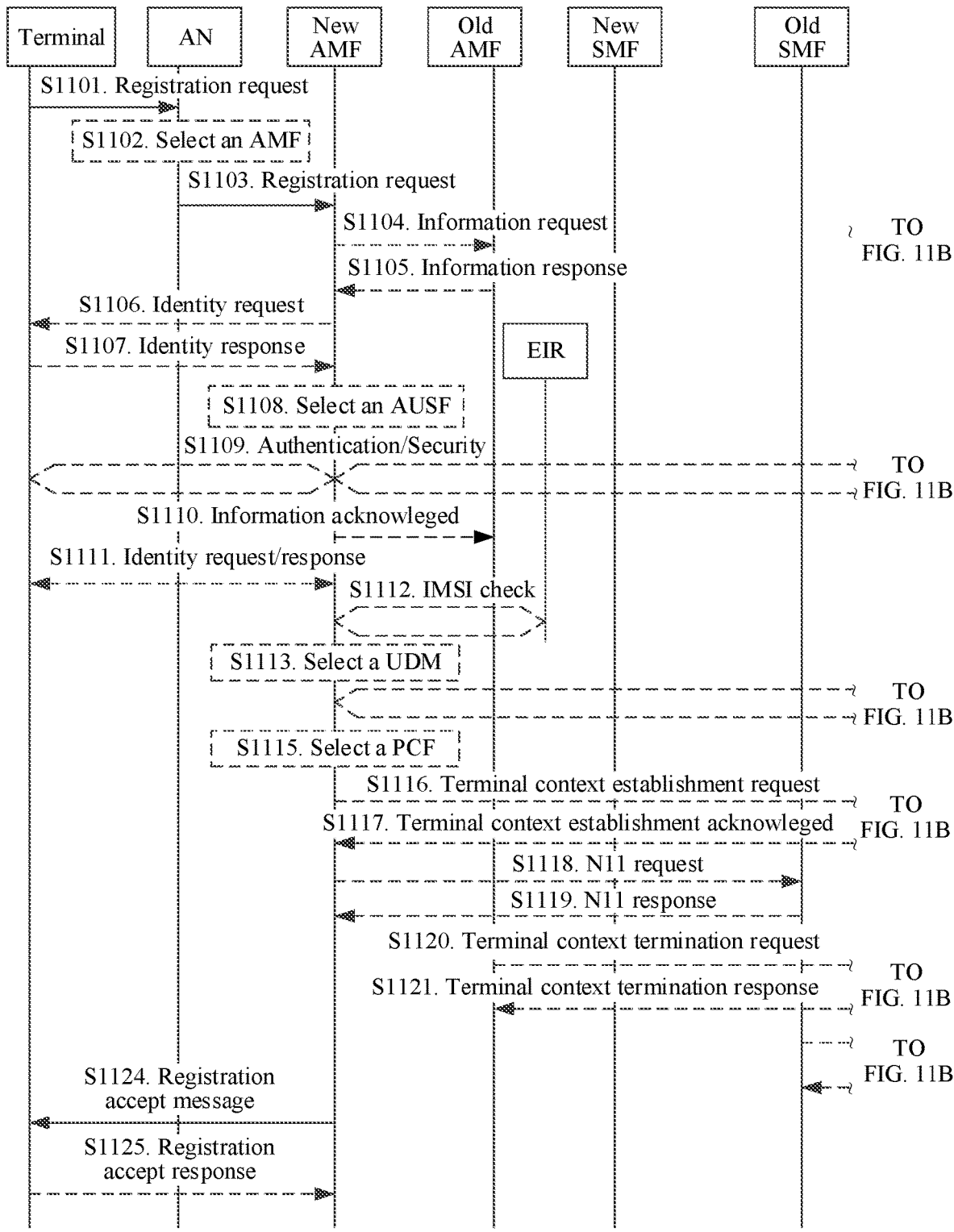
Figure 11B:
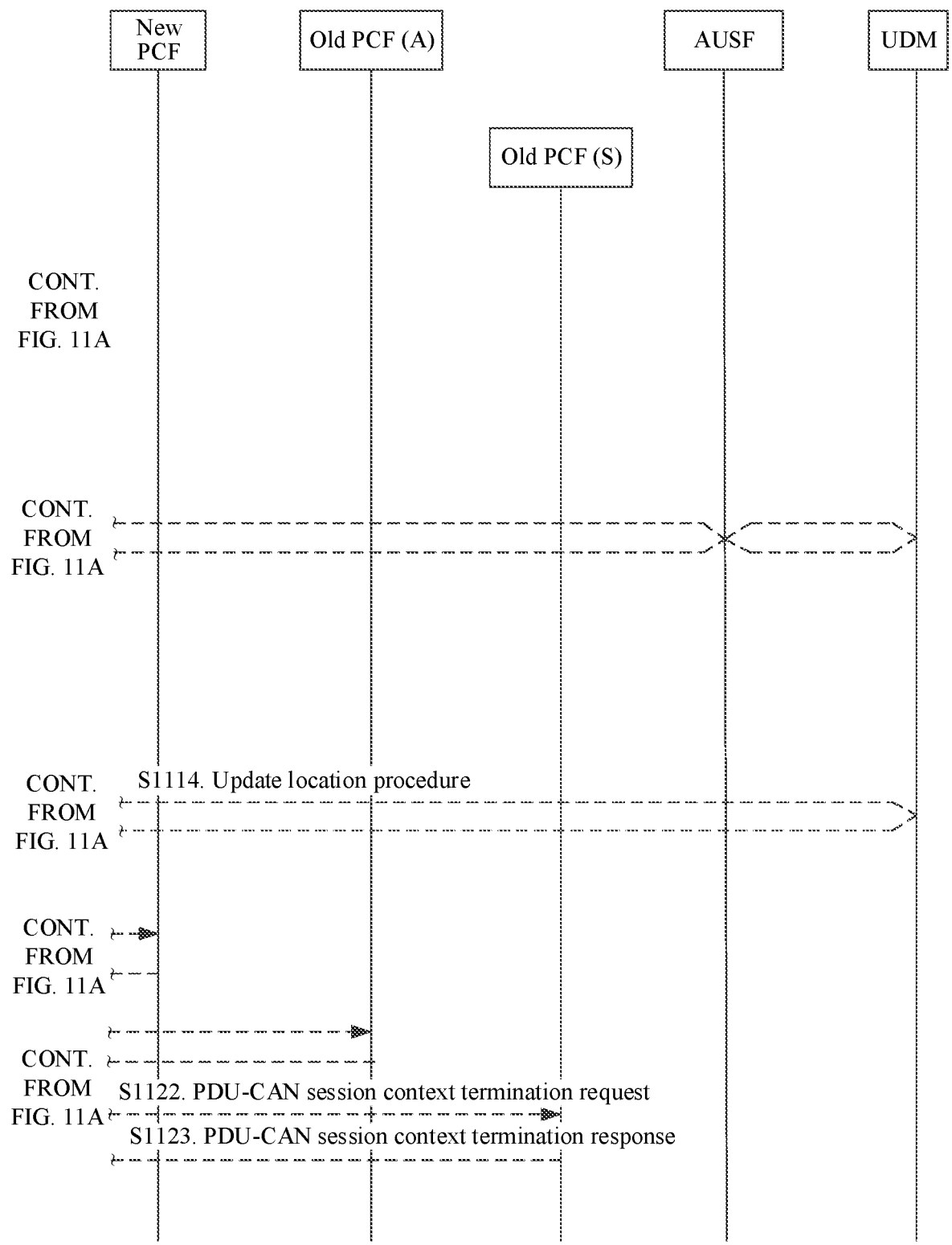

To better understand the method for deleting a session context provided in the embodiment shown in FIG. 10, the following provides another embodiment for describing a registration procedure of a terminal, to determine how the method for deleting a session context provided in the embodiment shown in FIG. 10 is performed in the registration procedure of the terminal. FIG. 11A and FIG. 11B are a flowchart of the registration procedure of the terminal.

S1101. The terminal sends a Registration Request to an access network, and the access network receives the Registration Request.

S1102. The access network selects an AMF.

S1103. The access network sends the Registration Request to the selected AMF, and the selected AMF receives the Registration Request sent by the access network.

In the embodiment shown in FIG. 11A and FIG. 11B, an example in which the AMF connected to the terminal before the terminal is abnormally deregistered is different from the AMF connected to the terminal after the terminal accesses the network again after being abnormally deregistered is used. Therefore, the AMF selected by the access network in S1103 is a New AMF, and the AMF connected to the terminal before the terminal is abnormally deregistered is an Old AMF.

S1104. The New AMF sends, to the Old AMF, an Information Request that is used to request to obtain an SUPI of the terminal. The Old AMF receives the Information Request.

In this embodiment of the present application, an example in which the delete request message in S1001 in the embodiment shown in FIG. 10 is implemented by using the session context delete indicator is used. As an example, the session context delete indicator may be carried in the Information Request in S1104 and sent to the Old AMF. For example, the session context delete indicator is a PDU session release indicator.

S1105. The Old AMF sends an Information Response to the New AMF, and the New AMF receives the Information Response.

If the Information Request in S1104 carries a PDU session Release indication, the Old AMF may add a PDU session release ACK to the Information Response.

S1106. The New AMF sends an Identity Request to the terminal. If the SUPI of the terminal is not obtained in S1104, the Identity Request in S1106 is used to continue to request to obtain the SUPI that is used to uniquely identify the terminal. The terminal receives the Identity Request.

S1107. The terminal sends an Identity Response to the New AMF, and the New AMF receives the Identity Response.

S1108. The New AMF selects an AUSF. That is, the New AMF selects a server that may be configured to perform authentication.

S1109. Authentication/Security is performed between the terminal and the New AMF, between the New AMF and the selected AUSF, and between the AUSF and a UDM.

S1110. The New AMF sends Information Acknowledged to the Old AMF, to obtain acknowledged information from the Old AMF. The Old AMF receives the Information Acknowledged sent by the New AMF.

If the delete request message in S1001 in the embodiment shown in FIG. 10 is implemented through the session context delete indicator, in another example, the session context delete indicator may be carried in the Information Acknowledged in S1110 and sent to the Old AMF. For example, the session context delete indicator is the PDU session Release indication.

S1111. An Identity Request/Response is performed between the terminal and the New AMF. In S1111, ID information of a device is authenticated and responded.

S1112. An ME Identity check is performed between the New AMF and an EIR. The EIR stores an IMEI of the terminal, and enables the network to have functions of preventing access by an unauthorized terminal, monitoring running of a faulty device, and guaranteeing secure running of the network by checking three tables: a white list, a black list, and a gray list.

S1113. The New AMF selects the UDM.

S1114. The New AMF initiates an Update Location Procedure to the selected UDM.

S1115. The New AMF selects a PCF.

S1116. The New AMF sends, to the selected PCF, a Terminal Context Establishment Request that is used to request the PCF to establish a context of the terminal. The selected PCF receives the Terminal Context Establishment Request. For example, the selected PCF is a New PCF.

S1117. After establishing the context of the terminal, the New PCF sends a Terminal Context Establishment Acknowledged to the New AMF. The New AMF receives the Terminal Context Establishment Acknowledged.

S1118. The New AMF sends, to the Old SMF, an N11 Request that is used to interact session information. The Old SMF receives the N11 Request.

For example, S1002 in the embodiment shown in FIG. 10 may be implemented in S1118. The Old SMF deletes the PDU Session context based on the received N11 Request.

S1119. The Old SMF sends an N11 Response to the New AMF.

S1120. The Old AMF sends, to an Old PCF corresponding to the AMF, a Terminal Context Termination Request that is used to delete a terminal context in the PCF corresponding to the AMF. The Old PCF receives the Terminal Context Termination Request sent by the Old AMF.

In FIG. 11A and FIG. 11B, the Old PCF corresponding to the AMF is denoted as an Old PCF (A).

S1121. The Old PCF corresponding to the AMF sends a Terminal Context Termination Acknowledged to the Old AMF, and the Old AMF receives the Terminal Context Termination Acknowledged sent by the Old PCF corresponding to the AMF.

S1122. The Old SMF sends a PDU-CAN session Context Termination Request to an Old PCF corresponding to an SMF, where the PDU-CAN session Context Termination Request is used to request to delete a PDU-CAN session context stored in the PCF. The Old PCF corresponding to the SMF receives the PDU-CAN session Context Termination Request.

In FIG. 11A and FIG. 11B, the Old PCF corresponding to the SMF is denoted as an Old PCF (S).

The Old PCF corresponding to the SMF deletes, based on the received PDU-CAN session Context Termination Request, the PDU-CAN session context that is stored in the Old PCF and that is of the terminal.

The PDU-CAN session context deleted by the Old PCF corresponding to the SMF is a PDU-CAN session context that is not deleted by the Old PCF corresponding to the SMF after the terminal is abnormally deregistered.

That is, S1004 and S1005 in the embodiment shown in FIG. 10 may be performed in S1122.

S1123. The Old PCF corresponding to the SMF sends a PDU-CAN session Context Termination Response to the Old SMF, to notify the Old SMF that the PDU-CAN session context is already deleted. The Old SMF receives the PDU-CAN session Context Termination Response.

That is, S1006 in the embodiment shown in FIG. 10 may be performed in S1123.

S1124. The New AMF sends, to the terminal, a Registration Accept message that is used to indicate that registration of the terminal already succeeds. The terminal receives the Registration Accept message.

S1125. The terminal sends a Registration Complete message to the New AMF, and the New AMF receives the Registration Complete message. Until now, the registration procedure of the terminal is completed.

Figure 12A:
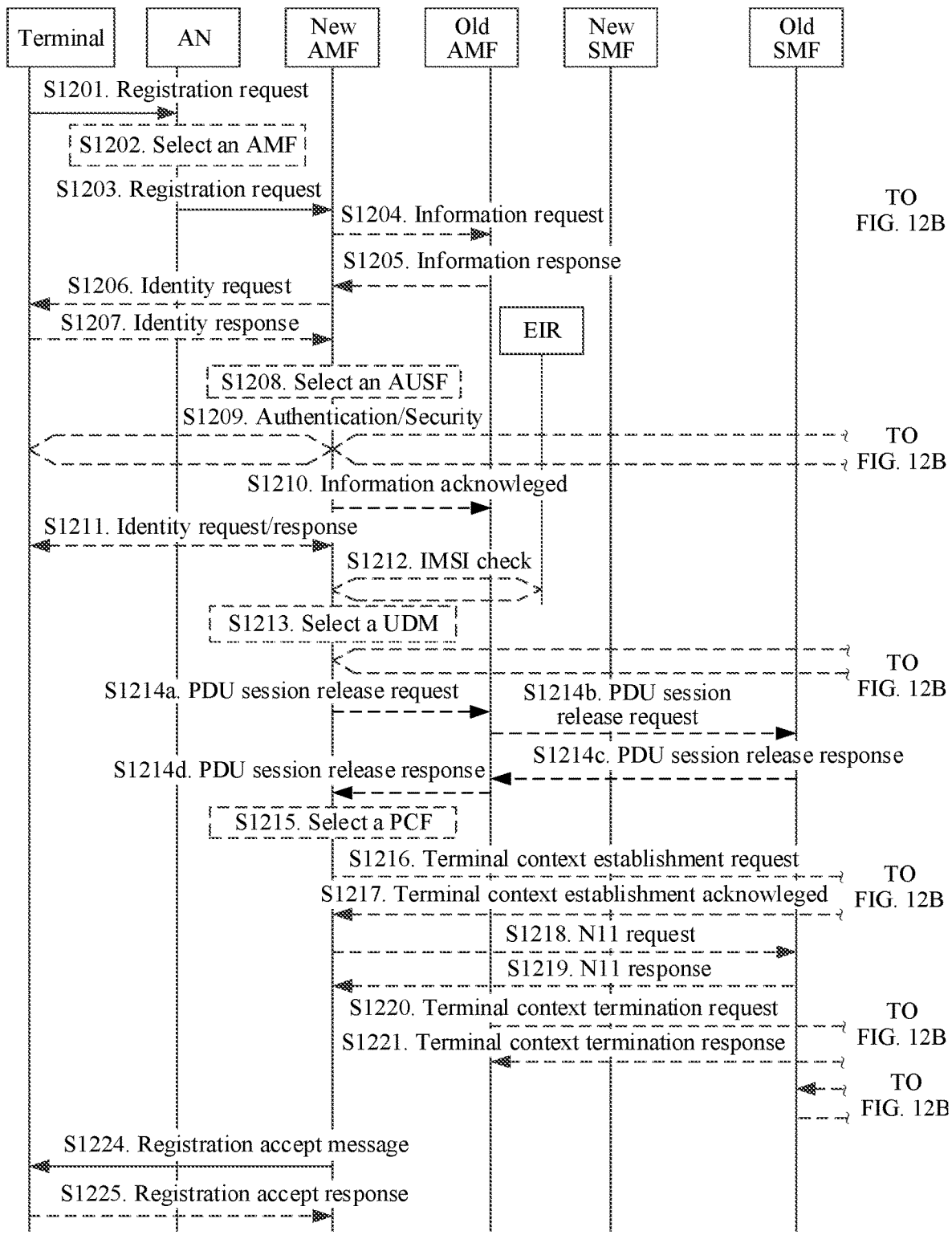
Figure 12B:
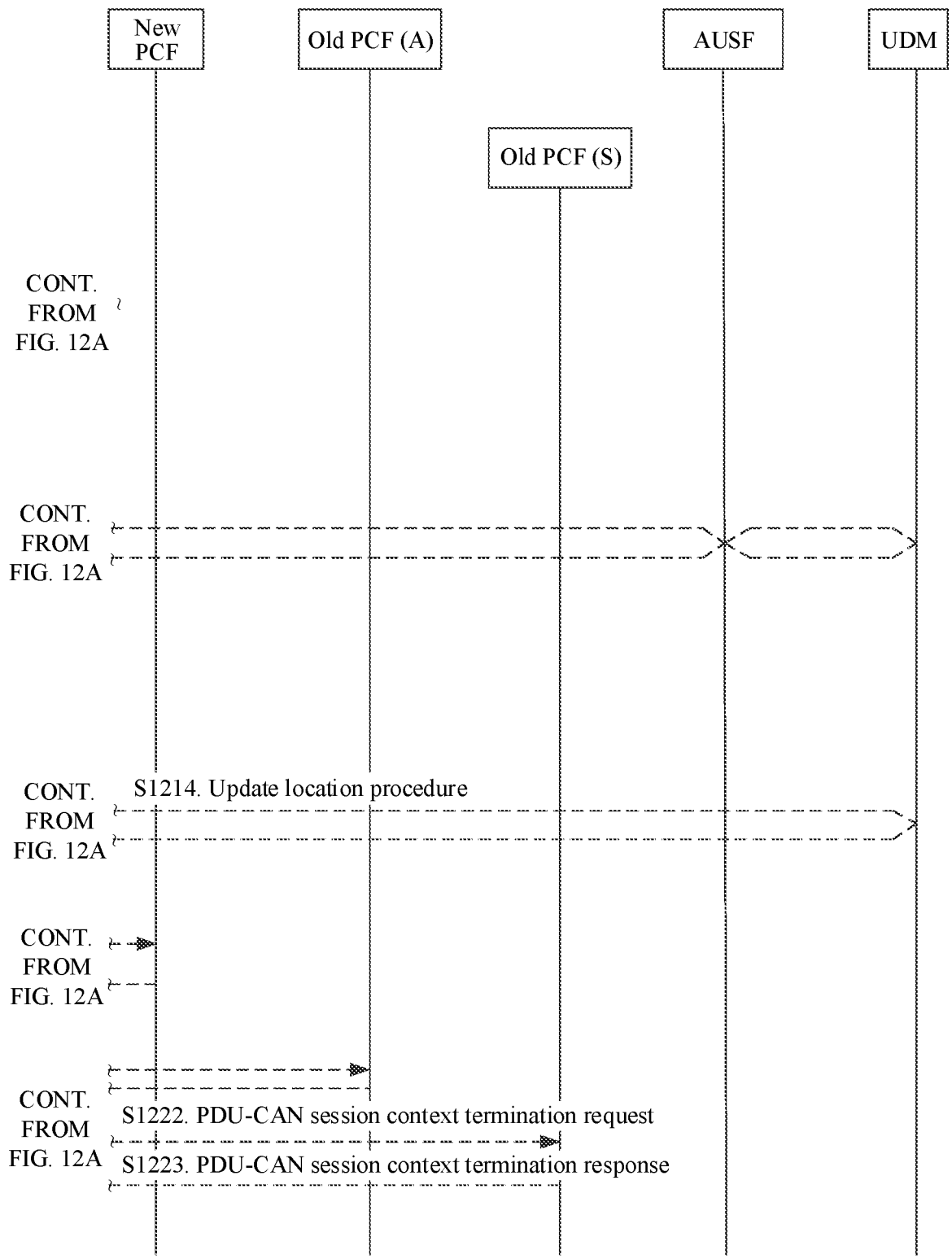

In the embodiment shown in FIG. 11A and FIG. 11B, an example in which the delete request message in S1001 in the embodiment shown in FIG. 10 is implemented through the session context delete indicator is used. To better understand the method for deleting a session context provided in the embodiment shown in FIG. 10, the following further provides another embodiment for describing a registration procedure of a terminal, to determine how the method for deleting a session context provided in the embodiment shown in FIG. 10 is performed in the registration procedure of the terminal. In the registration procedure, an example in which the delete request message in S1001 in the embodiment shown in FIG. 10 is implemented through the session context delete request is used. FIG. 12A and FIG. 12B are a flowchart of the registration procedure of the terminal.

S1201. The terminal sends a Registration Request to an access network, and the access network receives the Registration Request.

S1202. The access network selects an AMF.

S1203. The access network sends the Registration Request to the selected AMF, and the selected AMF receives the Registration Request sent by the access network.

In the embodiment shown in FIG. 12A and FIG. 12B, an example in which the AMF connected to the terminal before the terminal is abnormally deregistered is different from the AMF connected to the terminal after the terminal accesses the network again after being abnormally deregistered is used. Therefore, the AMF selected by the access network in S1203 is a New AMF, and the AMF connected to the terminal after the terminal is abnormally deregistered is an Old AMF.

S1204. The New AMF sends, to the Old AMF, an Information Request that is used to request to obtain an SUPI of the terminal. The Old AMF receives the Information Request.

S1205. The Old AMF sends an Information Response to the New AMF, and the New AMF receives the Information Response.

S1206. The New AMF sends an Identity Request to the terminal. If the SUPI of the terminal is not obtained in S1204, the Identity Request in S1206 is used to continue to request to obtain the SUPI that is used to uniquely identify the terminal. The terminal receives the Identity Request.

S1207. The terminal sends an Identity Response to the New AMF, and the New AMF receives the Identity Response.

S1208. The New AMF selects an AUSF. That is, the New AMF selects a server that may be configured to perform authentication.

S1209. Authentication/Security is performed between the terminal and the New AMF, between the New AMF and the selected AUSF, and between the AUSF and a UDM.

S1210. The New AMF sends Information Acknowledged to the Old AMF, to obtain acknowledged information from the Old AMF. The Old AMF receives the Information Acknowledged sent by the New AMF.

S1211. An Identity Request/Response is performed between the terminal and the New AMF. In S1211, ID information of a device is authenticated and responded.

S1212. An ME Identity check is performed between the New AMF and an EIR.

S1213. The New AMF selects the UDM.

S1214. The New AMF initiates an Update Location Procedure to the selected UDM. S1214 further includes sub-operations such as S1214a, S1214b, S1214c, and S1214d.

S1214a. The New AMF sends a PDU Session release Request to the Old SMF, where the PDU Session release Request is an implementation form of a delete request message, to instruct the Old AMF to trigger releasing a PDU session context that is not deleted after the terminal is abnormally deregistered. The Old AMF receives the PDU session Release Request.

That is, S1001 in the embodiment shown in FIG. 10 may be performed in S1214a.

S1214b. The Old AMF sends, to an Old SMF, the PDU session Release Request that is used to request to delete the PDU session context that is not deleted after the terminal is abnormally deregistered. The Old SMF receives the PDU session Release Request.

After receiving the PDU session Release Request, the Old SMF may delete the PDU session context that is stored in the Old SMF and that of the terminal after the terminal is abnormally deregistered.

That is, S1002 and S1003 in the embodiment shown in FIG. 10 may be performed in S1214b.

S1214c. The Old SMF sends a PDU session Release Response to the Old AMF, to notify the Old AMF that the PDU session context that is stored in the Old SMF and not deleted after the terminal is abnormally deregistered is already deleted. The Old AMF receives the PDU session Release Response.

S1214d. The Old AMF sends the PDU session Release Response to the New AMF, and the New AMF receives the PDU session Release Response.

S1215. The New AMF selects a PCF.

S1216. The New AMF sends, to the selected PCF, a Terminal Context Establishment Request that is used to request the PCF to establish a context of the terminal. The selected PCF receives the Terminal Context Establishment Request. For example, the selected PCF is a New PCF.

S1217. After establishing the context of the terminal, the New PCF sends a Terminal Context Establishment Acknowledged to the New AMF. The New AMF receives the Terminal Context Establishment Acknowledged.

S1218. The New AMF sends, to the Old SMF, an N11 Request that is used to interact session information. The Old SMF receives the N11 Request.

S1219. The Old SMF sends an N11 Response to the New AMF.

S1220. The Old AMF sends, to an Old PCF corresponding to the AMF, a Terminal Context Termination Request that is used to delete a terminal context in the PCF corresponding to the AMF. The Old PCF receives the Terminal Context Termination Request sent by the Old AMF.

In FIG. 12A and FIG. 12B, the Old PCF corresponding to the AMF is denoted as an Old PCF (A).

S1221. The Old PCF corresponding to the AMF sends a Terminal Context Termination Acknowledged to the Old AMF, and the Old AMF receives the Terminal Context Termination Acknowledged sent by the Old PCF corresponding to the AMF.

S1222. The Old SMF sends a PDU-CAN session Context Termination Request to an Old PCF corresponding to an SMF, where the PDU-CAN session Context Termination Request is used to request to delete a PDU-CAN session context stored in the PCF. The Old PCF corresponding to the SMF receives the PDU-CAN session Context Termination Request.

In FIG. 12A and FIG. 12B, the Old PCF corresponding to the SMF is denoted as an Old PCF (S).

The Old PCF corresponding to the SMF deletes, based on the received PDU-CAN session Context Termination Request, the PDU-CAN session context that is stored in the Old PCF and that is of the terminal.

The PDU-CAN session context deleted by the Old PCF corresponding to the SMF is a PDU-CAN session context that is not deleted by the Old PCF corresponding to the SMF after the terminal is abnormally deregistered.

That is, S1004 and S1005 in the embodiment shown in FIG. 10 may be performed in S1222.

S1223. The Old PCF that is corresponding to the SMF sends a PDU-CAN session Context Termination Response to the Old SMF, to tell the Old SMF that the PDU-CAN session context is deleted. The Old SMF receives the PDU-CAN session Context Termination Response.

That is, S1006 in the embodiment shown in FIG. 10 may be performed in S1223.

S1224. The New AMF sends, to the terminal, a Registration Accept message that is used to indicate that registration of the terminal already succeeds. The terminal receives the Registration Accept message.

S1225. The terminal sends a Registration Complete message to the New AMF, and the New AMF receives the Registration Complete message. Until now, the registration procedure of the terminal is completed.

Figure 13:
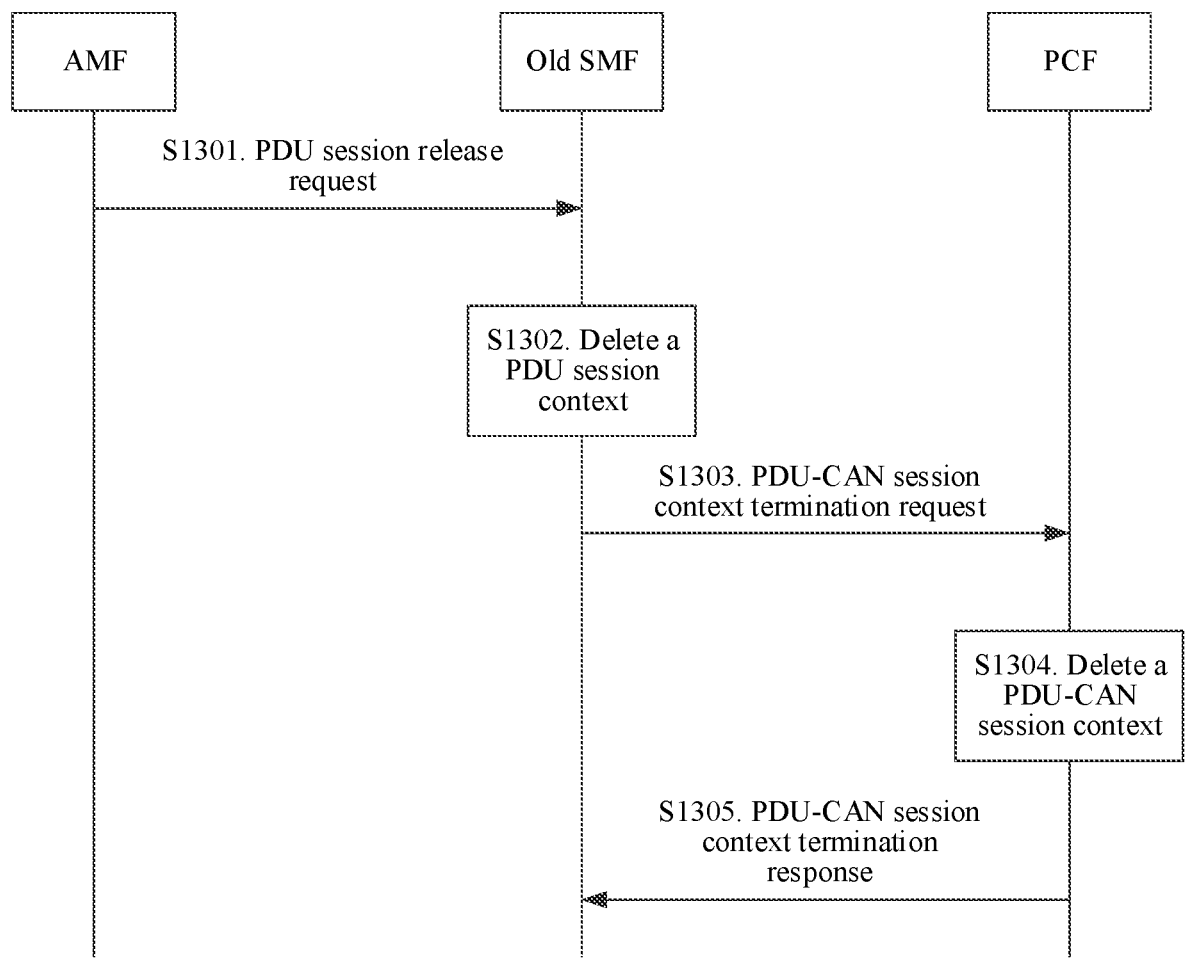

In the embodiment shown in any one of FIG. 8 to FIG. 12A and FIG. 12B, an example in which the AMF connected to the terminal before the terminal is abnormally deregistered is different from the AMF connected to the terminal after the terminal accesses the network again after being abnormally deregistered is used. That is, the AMF changes after the terminal accesses the network again. The following describes another embodiment. In this embodiment, an example in which the AMF connected to the terminal before the terminal is abnormally deregistered is the same as the AMF connected to the terminal after the terminal accesses the network again after being abnormally deregistered is used. That is, the AMF does not change after the terminal accesses the network again. FIG. 13 describes an implementation procedure of this embodiment.

S1301. An AMF sends, to an Old SMF, a PDU Session release Request that is used to request to delete an activated PDU Session context. The Old SMF receives the PDU Session release Request sent by the AMF.

S1302. The Old SMF deletes, based on the received PDU Session release Request, the PDU Session context before the terminal is abnormally deregistered.

S1303. The Old SMF sends, to a PCF, a PDU-CAN session Context Termination Request that is used to request to delete a PDU-CAN session context in the PCF. The PCF receives the PDU-CAN session Context Termination Request sent by the Old SMF.

S1304. The PCF deletes, based on the received PDU-CAN session Context Termination Request, the PDU-CAN session context before the terminal is abnormally deregistered.

S1305. After deleting the PDU-CAN session context, the PCF sends a PDU-CAN session Context Termination Response to the Old SMF, to notify the Old SMF that the PDU-CAN session context before the terminal is abnormally deregistered is already deleted. The Old SMF receives the PDU-CAN session Context Termination Response sent by the PCF.

Figure 14A:
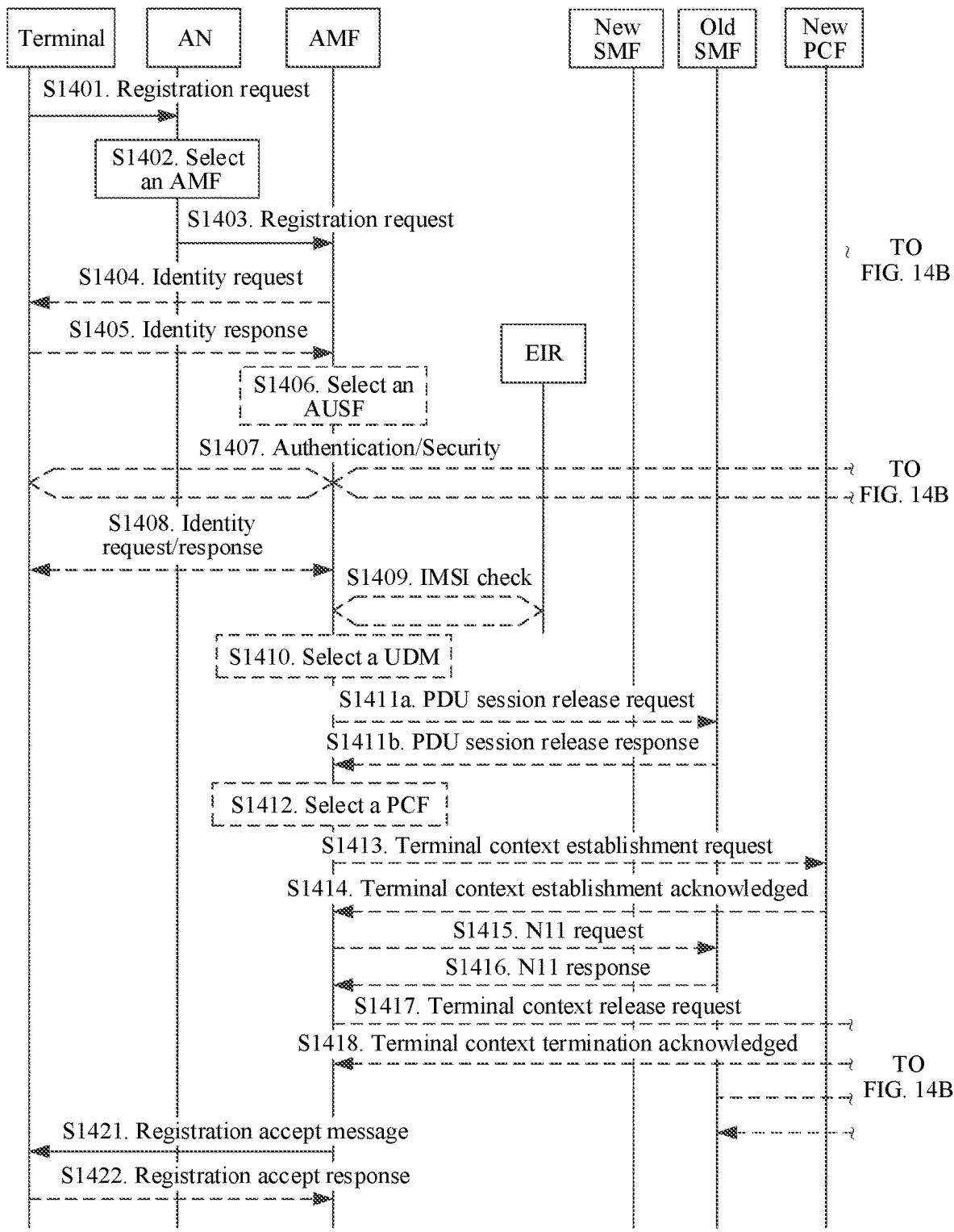
Figure 14B:
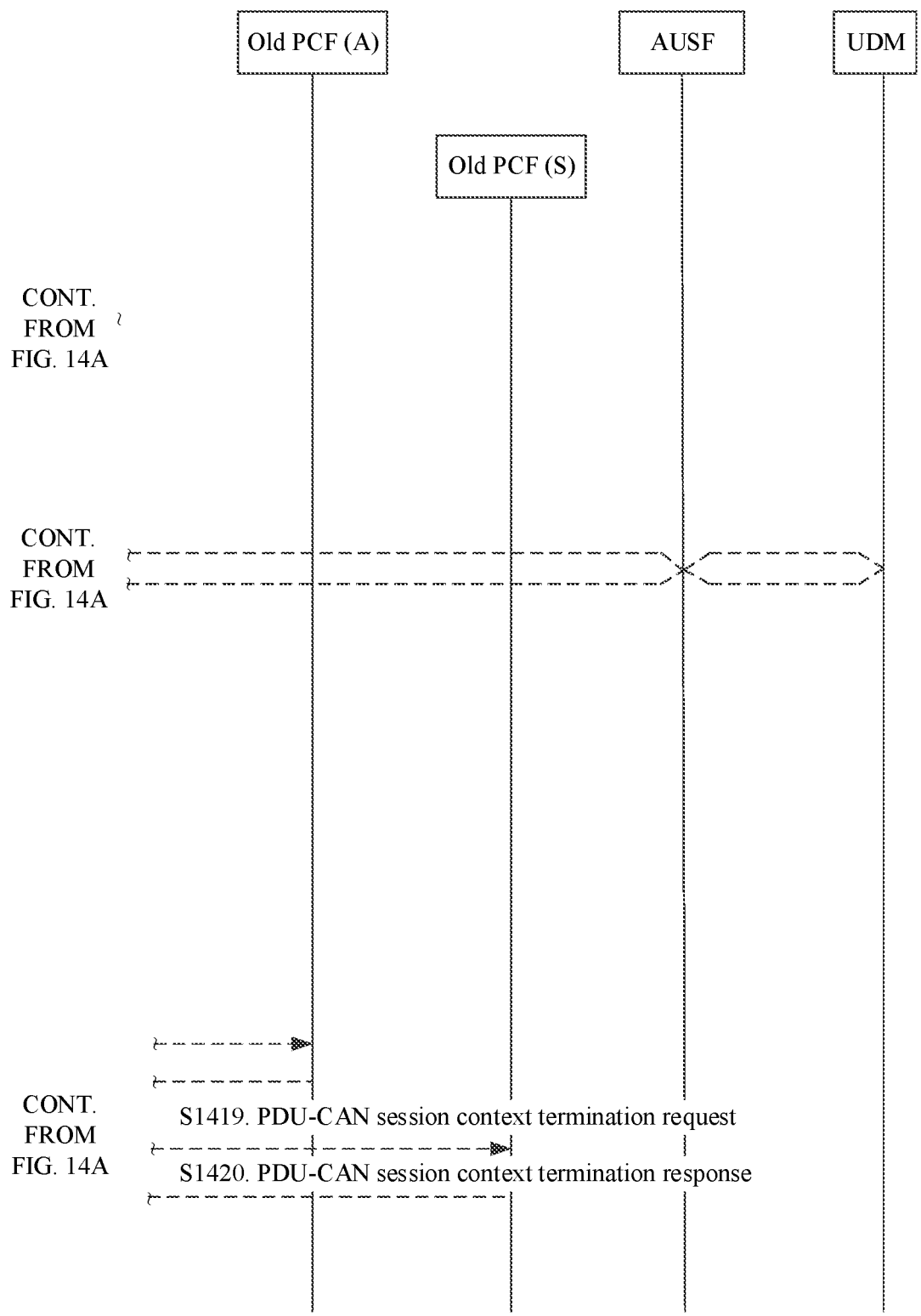

To better understand the method for deleting a session context provided in the embodiment shown in FIG. 13, the following provides another embodiment for describing a registration procedure of a terminal, to determine how the method for deleting a session context provided in embodiment shown in FIG. 13 is performed in the registration procedure of the terminal. FIG. 14A and FIG. 14B are a flowchart of the registration procedure of the terminal.

S1401. The terminal sends a Registration Request to an access network, and the access network receives the Registration Request.

S1402. The access network selects an AMF.

S1403. The access network sends the Registration Request to the selected AMF, and the selected AMF receives the Registration Request sent by the access network.

In the embodiment shown in FIG. 14A and FIG. 14B, an example in which the AMF connected to the terminal before the terminal is abnormally deregistered is the same as the AMF connected to the terminal after the terminal accesses the network again after being abnormally deregistered is used. Therefore, the AMF selected by the access network in S1403 and the AMF connected to the terminal before the terminal is abnormally deregistered are a same AMF.

S1404. The AMF sends an Identity Request to the terminal, and the terminal receives the Identity Request.

S1405. The terminal sends an Identity Response to the AMF, and the AMF receives the Identity Response.

S1406. The New AMF selects an AUSF.

S1407. Authentication/Security is performed between the terminal and the AMF, between the AMF and the selected AUSF, and between the AUSF and a UDM.

S1408. An Identity Request/Response is performed between the terminal and the New AMF.

S1409. An ME Identity check is performed between the AMF and an EIR.

S1410. The AMF selects the UDM.

S1411a. The AMF sends, to an Old SMF, a PDU Session release Request, where the PDU Session release Request is used to request to delete an activated PDU Session context. The Old SMF receives the PDU Session release Request.

The Old SMF deletes, based on the received PDU Session release Request message, the PDU Session context that is stored in the Old SMF and that is of the terminal, that is, the PDU session context of the terminal.

The PDU Session context deleted by the Old SMF is a PDU Session context that is not deleted by the Old SMF after the terminal is abnormally deregistered.

That is, S1301 and S1302 in the embodiment shown in FIG. 13 may be performed in S1411a.

S1411b. The Old SMF sends a PDU Session release Response to the Old AMF, to indicate that the Old SMF already deletes, based on the received PDU Session release Request message, the PDU Session context that is stored in the Old SMF and that is of the terminal. The UDM receives the PDU Session release Response.

S1411a and S1411b are both performed in an update location procedure initiated by the AMF.

S1412. The AMF selects a PCF.

S1413. The AMF sends, to the selected PCF, a Terminal Context Establishment Request that is used to request the PCF to establish a context of the terminal. The selected PCF receives the Terminal Context Establishment Request. For example, the selected PCF is a New PCF.

S1414. After establishing the context of the terminal, the New PCF sends a Terminal Context Establishment Acknowledged to the AMF, and the AMF receives the Terminal Context Establishment Acknowledged.

S1415. The AMF sends, to the Old SMF, an N11 Request that is used to interact session information. The Old SMF receives the N11 Request.

S1416. The Old SMF sends an N11 Response to the AMF.

S1417. The AMF sends, to an Old PCF corresponding to the AMF, a Terminal Context Termination Request that is used to delete a terminal context in the PCF corresponding to the AMF. The Old PCF receives the Terminal Context Termination Request sent by the AMF.

In FIG. 14A and FIG. 14B, the Old PCF corresponding to the AMF is denoted as an Old PCF (A).

S1418. The Old PCF corresponding to the AMF sends a Terminal Context Termination Acknowledged to the AMF, and the AMF receives the Terminal Context Termination Acknowledged sent by the Old PCF corresponding to the AMF.

S1419. The Old SMF sends a PDU-CAN session Context Termination Request to an Old PCF corresponding to an SMF, where the PDU-CAN session Context Termination Request is used to request to delete a PDU-CAN session context stored in the PCF. The Old PCF corresponding to the SMF receives the PDU-CAN session Context Termination Request.

In FIG. 14A and FIG. 14B, the Old PCF corresponding to the SMF is denoted as an Old PCF (S).

The Old PCF corresponding to the SMF deletes, based on the received PDU-CAN session Context Termination Request, the PDU-CAN session context that is stored in the Old PCF and that is of the terminal.

The PDU-CAN session context deleted by the Old PCF corresponding to the SMF is a PDU-CAN session context that is not deleted by the Old PCF corresponding to the SMF after the terminal is abnormally deregistered.

That is, S1303 and S1304 in the embodiment shown in FIG. 13 may be performed in S1419.

S1420. The Old PCF corresponding to the SMF sends a PDU-CAN session Context Termination Response to the Old SMF, to notify the Old SMF that the PDU-CAN session context is already deleted. The Old SMF receives the PDU-CAN session Context Termination Response.

That is, S1305 in the embodiment shown in FIG. 13 may be performed in S1420.

S1421. The AMF sends, to the terminal, a Registration Accept message that is used to indicate that registration of the terminal already succeeds. The terminal receives the Registration Accept message.

S1422. The terminal sends a Registration Complete message to the AMF, and the AMF receives the Registration Complete message. Until now, the registration procedure of the terminal is completed.

In the foregoing embodiment described above, the terminal is always in a coverage of a same operator before and after the abnormal deregistration. If the terminal roams, for example, from a coverage of an operator A to a coverage of an operator B, and is abnormally deregistered after the terminal accesses the network provided by the operator B, in this case, deleting, from an SMF provided by the operator B, a PDU session context before the terminal is abnormally deregistered needs to be considered. For a schematic diagram of a scenario in which the terminal roams, continue to refer to FIG. 6.

Figure 15:
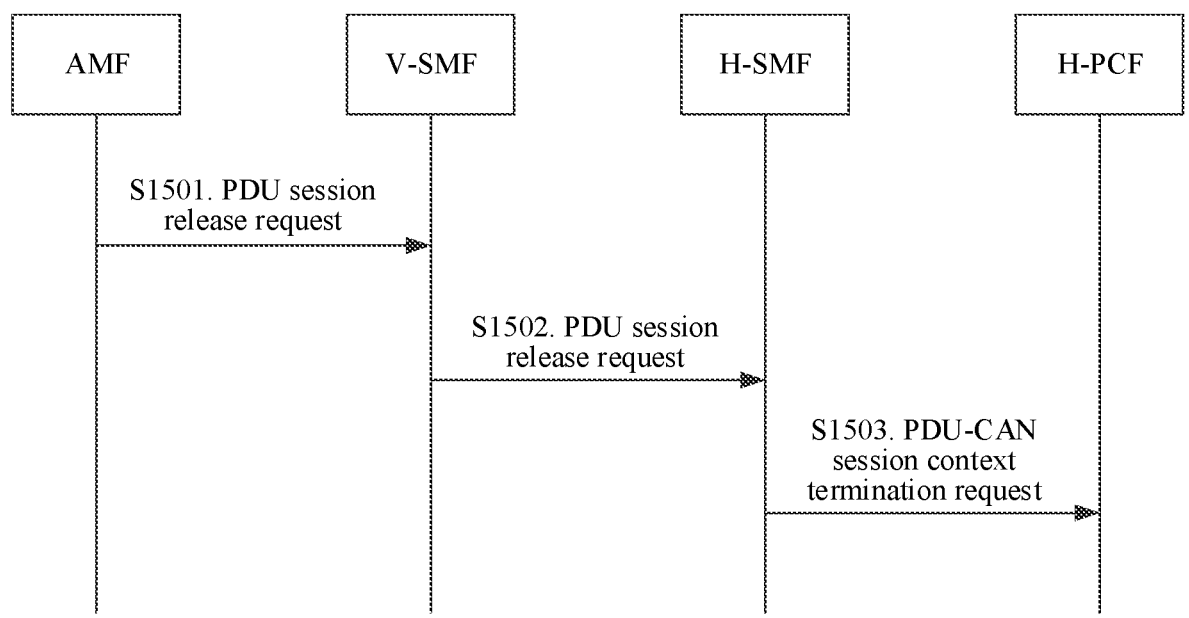

The following further provides an embodiment for resolving the problem. In the embodiment shown in FIG. 7, the UDM triggers deleting the PDU Session context from the SMF. The following describes an embodiment in which an AMF triggers deleting a PDU Session context from an SMF. Referring to FIG. 15, a procedure of this embodiment is described as follows.

S1501. An AMF sends, to a V-SMF, a PDU Session release Request that is used to request to delete an activated PDU Session context before a terminal is abnormally deregistered. The V-SMF receives the PDU Session release Request sent by the AMF.

After receiving the PDU Session release Request, the V-SMF may delete the PDU Session context that is stored in the V-SMF and that is of the terminal before the terminal is abnormally deregistered.

S1502. The V-SMF sends, to an H-SMF, a PDU Session release Request that is used to request to delete the activated PDU Session context before the terminal is abnormally deregistered. The H-SMF receives the PDU Session release Request sent by the V-SMF.

After receiving the PDU Session release Request, the H-SMF may delete the PDU Session context that is stored in the H-SMF and that is of the terminal before the terminal is abnormally deregistered.

S1503. The H-SMF sends, to an H-PCF, a PDU-CAN session Context Termination Request that is used to request to delete a PDU-CAN session context in the H-PCF.

After receiving the PDU-CAN session Context Termination Request, the H-PCF may delete the PDU-CAN session context that is stored in the H-PCF and that is of the terminal before the terminal is abnormally deregistered.

It can be seen that in this embodiment of the present application, the AMF triggers and enables the V-SMF to delete the activated PDU Session context, and by using the V-SMF, the H-SMF may further be enabled to delete the activated PDU Session context and the H-PCF may further be enabled to delete the activated PDU-CAN session context.

Figure 16:
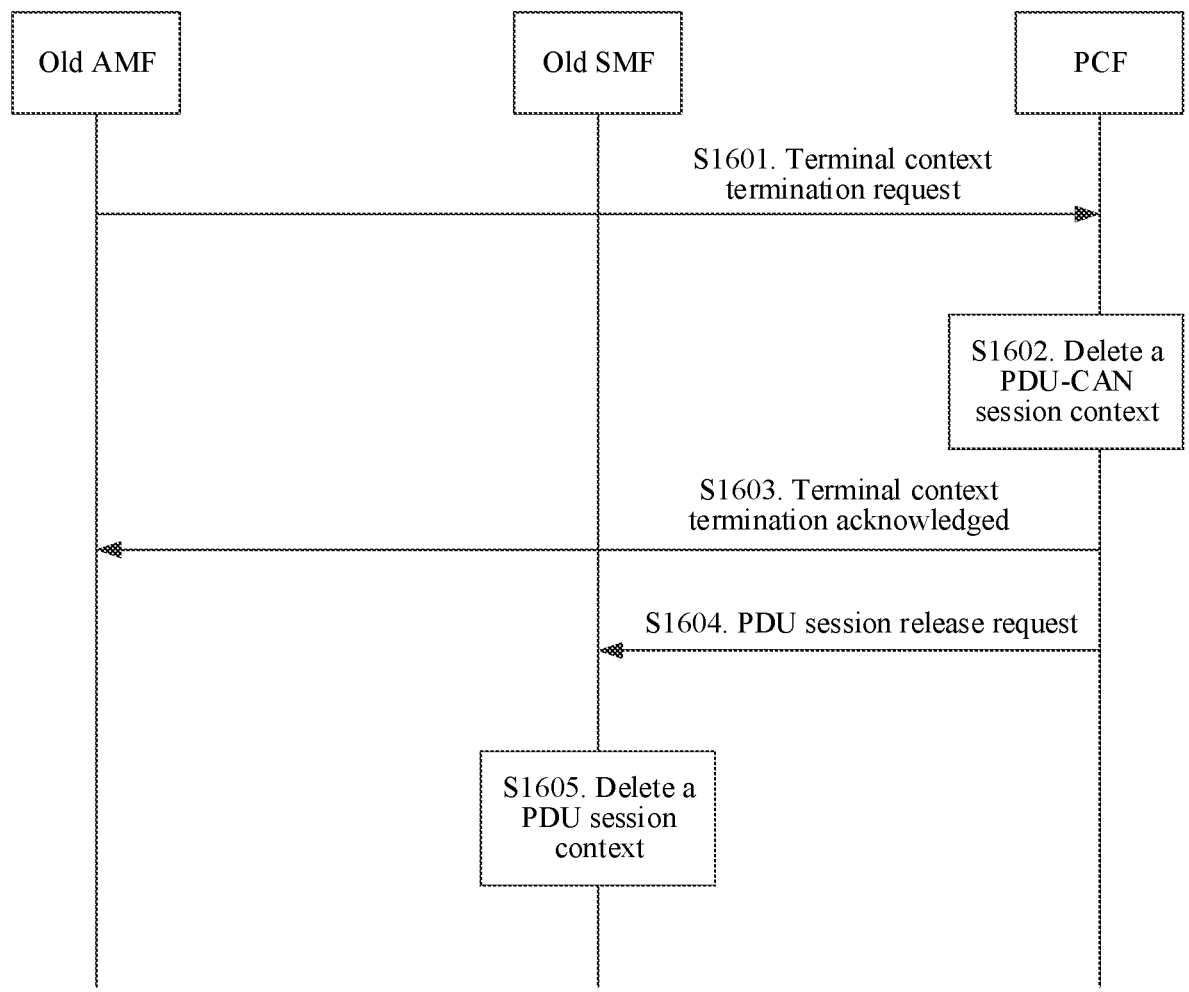

In the foregoing embodiment described above, the AMF and the SMF correspond to different PCFs. However, when the AMF and the SMF correspond to a same PCF, the session context may be deleted by using the method described in the foregoing embodiment, and may further be deleted in a PCF triggering manner. This is described below. FIG. 16 shows a procedure of triggering, by a PCF, deleting a session context.

S1601. An Old AMF sends, to a PCF, a delete request message that is used to instruct the PCF to trigger releasing a PDU session context that is not deleted after a terminal is abnormally deregistered.

For example, the delete request message is implemented by using a Terminal Context Termination Request that is used to request to delete a PDU-CAN session context in the PCF before the terminal is abnormally deregistered. The PCF receives the Terminal Context Termination Request.

The Old AMF is an AMF before the terminal is abnormally deregistered.

S1602. The PCF deletes, based on the received Context Termination Request message, the PDU-CAN session context before the terminal is abnormally deregistered.

S1603. The PCF sends a Terminal Context Termination Acknowledged to the Old AMF, to notify the Old AMF that the PDU-CAN session context before the terminal is abnormally deregistered is already deleted. The Old AMF receives the Terminal Context Termination Acknowledged.

S1604. The PCF sends, to an Old SMF, a PDU Session release Request that is used to request to delete an activated PDU Session context before the terminal is abnormally deregistered. The Old SMF receives the PDU Session release Request.

S1605. The Old SMF deletes, based on the received PDU Session release Request, the PDU Session context before the terminal is abnormally deregistered.

Figure 17A:
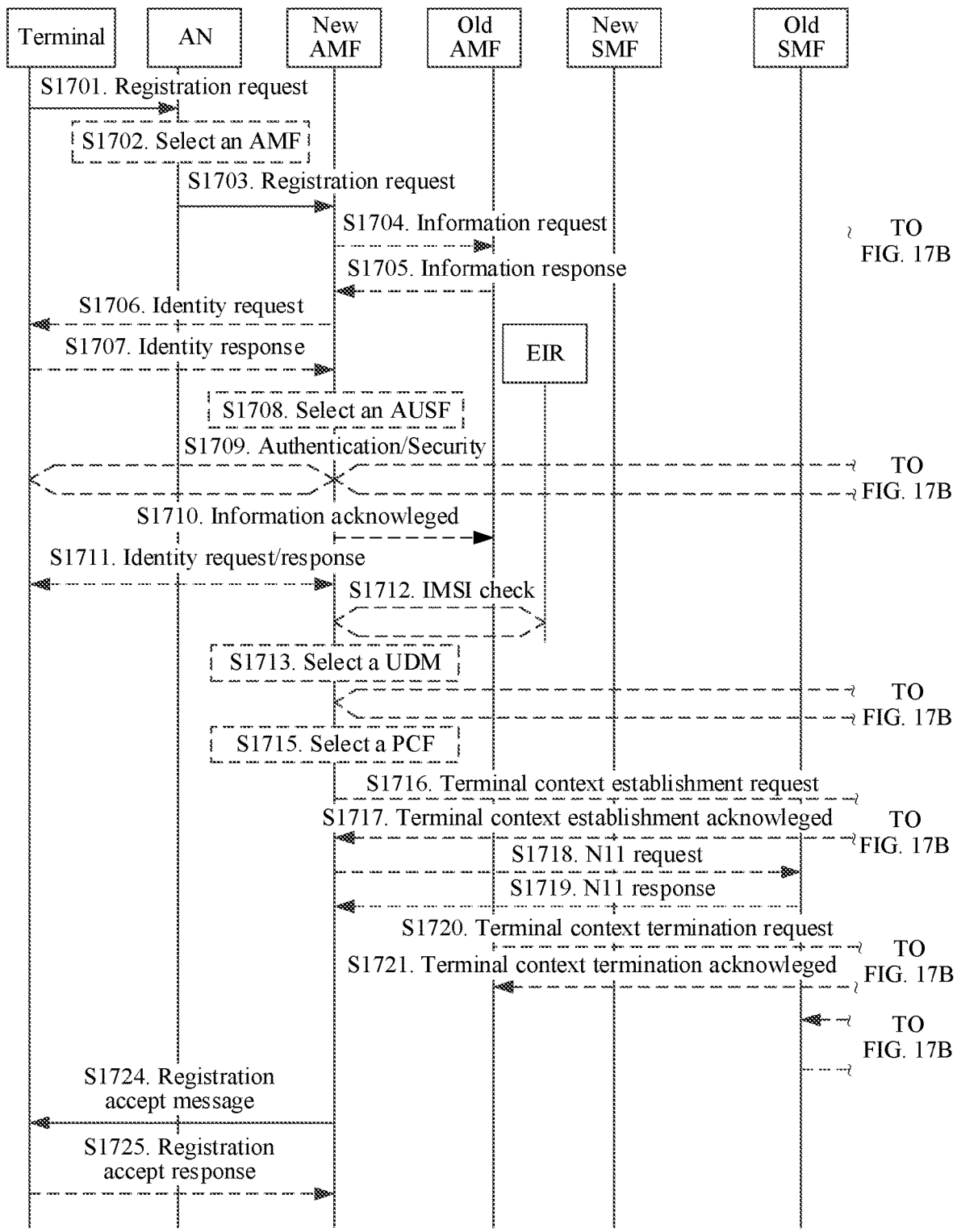
Figure 17B:
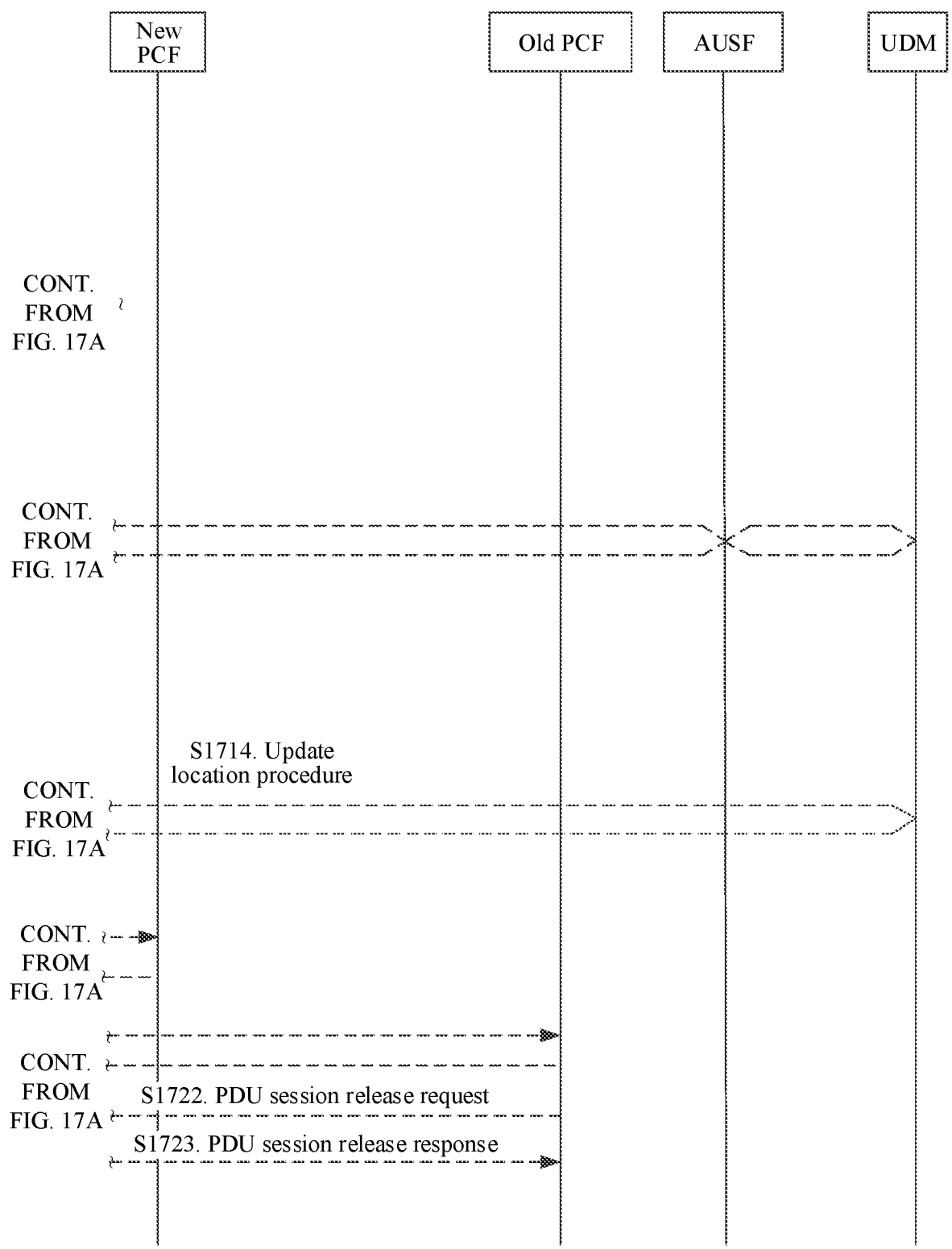

To better understand the method for deleting a session context provided in the embodiment shown in FIG. 16, the following provides another embodiment for describing a registration procedure of a terminal, to determine how the method for deleting a session context provided in the embodiment shown in FIG. 16 is performed in the registration procedure of the terminal. FIG. 17A and FIG. 17B are a flowchart of the registration procedure of the terminal.

S1701. The terminal sends a Registration Request to an access network, and the access network receives the Registration Request.

S1702. The access network selects an AMF.

S1703. The access network sends the Registration Request to the selected AMF, and the selected AMF receives the Registration Request sent by the access network.

In the embodiment shown in FIG. 17A and FIG. 17B, an example in which the AMF connected to the terminal before the terminal is abnormally deregistered is different from the AMF connected to the terminal after the terminal accesses the network again after being abnormally deregistered is used. Therefore, the AMF selected by the access network in S1703 is a New AMF, and the AMF connected to the terminal before the terminal is abnormally deregistered is an Old AMF S1704. The New AMF sends an Information Request to the Old AMF, and the Old AMF receives the Information Request.

S1705. The Old AMF sends an Information Response to the New AMF, and the New AMF receives the Information Response.

S1706. The New AMF sends an Identity Request to the terminal, and the terminal receives the Identity Request.

S1707. The terminal sends an Identity Response to the New AMF, and the New AMF receives the Identity Response.

S1708. The New AMF selects an AUSF.

S1709. Authentication/Security is performed between the terminal and the New AMF, between the New AMF and the selected AUSF, and between the AUSF and a UDM.

S1710. The New AMF sends Information Acknowledged to the Old AMF, and the Old AMF receives the Information Acknowledged sent by the New AMF.

S1711. An Identity Request/Response is performed between the terminal and the New AMF.

S1712. An ME Identity check is performed between the New AMF and an EIR.

S1713. The New AMF selects the UDM.

S1714. The New AMF initiates an Update Location Procedure to the selected UDM.

S1715. The New AMF selects a PCF.

S1716. The New AMF sends, to the selected PCF, a Terminal Context Establishment Request that is used to request the PCF to establish a context of the terminal. The selected PCF receives the Terminal Context Establishment Request. For example, the selected PCF is a New PCF.

S1717. After establishing the context of the terminal, the New PCF sends a Terminal Context Establishment Acknowledged to the New AMF. The New AMF receives the Terminal Context Establishment Acknowledged.

S1718. The New AMF sends, to the Old SMF, an N11 Request that is used to interact session information. The Old SMF receives the N11 Request.

S1719. The Old SMF sends an N11 Response to the New AMF.

S1720. The Old AMF sends, to an Old PCF, a Terminal Context Termination Request that is used to request to delete a PDU-CAN session context in the PCF before the terminal is abnormally deregistered. The Old PCF receives the Terminal Context Termination Request sent by the Old AMF.

The PCF deletes, based on the received Terminal Context Termination Request, the PDU-CAN session context before the terminal is abnormally deregistered.

In FIG. 17A and FIG. 17B, an Old PCF corresponding to an AMF and an Old PCF corresponding to an SMF are a same PCF.

That is, S1601 and S1602 in the embodiment shown in FIG. 16 may be performed in S1720.

S1721. The Old PCF sends a Terminal Context Termination Acknowledged to the Old AMF, and the Old AMF receives the Terminal Context Termination Acknowledged sent by the Old PCF.

S1722. The Old PCF sends, to the Old SMF, a PDU session release Request that is used to request to delete a PDU Session context stored in the Old SMF. The Old SMF receives the PDU session release Request.

The Old SMF deletes, based on the received PDU session release Request, the PDU session context that is stored in the Old SMF and that is of the terminal before the terminal is abnormally deregistered.

That is, S1604 and S1605 in the embodiment shown in FIG. 16 may be performed in S1722.

S1723. The Old SMF sends a PDU session release Response to the Old PCF, to notify the Old PCF that the PDU session context is already deleted. The Old PCF receives the PDU session release Response.

S1724. The New AMF sends, to the terminal, a Registration Accept message that is used to indicate that registration of the terminal already succeeds. The terminal receives the Registration Accept message.

S1725. The terminal sends a Registration Complete message to the New AMF, and the New AMF receives the Registration Complete message. Until now, the registration procedure of the terminal is completed.

In addition, it should be noted that in any one of accompanying drawings from FIG. 2 to FIG. 17A and FIG. 17B, an operation represented by a dashed line means an optional operation rather than a required operation in an implementation process.

The following describes an apparatus provided in an embodiment of the present application with reference to the accompanying drawings.

Figure 18:
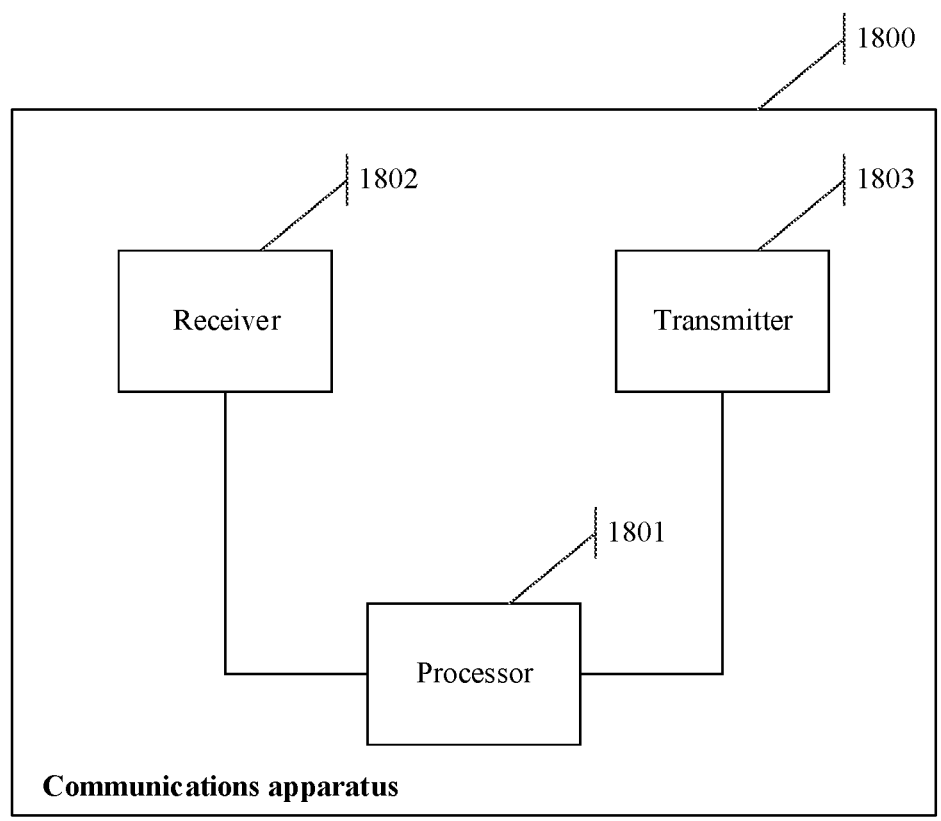
FIG. 18 to FIG. 20 are several structural schematic diagrams of a communications apparatus according to embodiments of the present application.

FIG. 18 is a structural schematic diagram of a communications apparatus 1800. The communications apparatus 1800 may implement the foregoing functions of the SMF. The communications apparatus 1800 may include a processor 1801 and a receiver 1802. The processor 1801 may be configured to perform S204 in the embodiment shown in FIG. 2, S314b in the embodiment shown in FIG. 3A and FIG. 3B, S403 in the embodiment shown in FIG. 4, S511c in the embodiment shown in FIG. 5A and FIG. 5B, S701 in the embodiment shown in FIG. 7, S804 in the embodiment shown in FIG. 8, S914b in the embodiment shown in FIG. 9A and FIG. 9B, S1003 in the embodiment shown in FIG. 10, S1118 in the embodiment shown in FIG. 11A and FIG. 11B, S1214b in the embodiment shown in FIG. 12A and FIG. 12B, S1302 in the embodiment shown in FIG. 13, S1411a in the embodiment shown in FIG. 14A and FIG. 14B, S1502 in the embodiment shown in FIG. 15, S1605 in the embodiment shown in FIG. 16, and S1722 in the embodiment shown in FIG. 17A and FIG. 17B, and/or another process that is used to support technologies described in the specification. The receiver 1802 may be configured to perform S203 in the embodiment shown in FIG. 2, S314b in the embodiment shown in FIG. 3A and FIG. 3B, S402 in the embodiment shown in FIG. 4, S511c in the embodiment shown in FIG. 5A and FIG. 5B, S701 in the embodiment shown in FIG. 7, S803 in the embodiment shown in FIG. 8, S914b in the embodiment shown in FIG. 9A and FIG. 9B, S1003 in the embodiment shown in FIG. 10, S1118 in the embodiment shown in FIG. 11A and FIG. 11B, S1214b in the embodiment shown in FIG. 12A and FIG. 12B, S1301 in the embodiment shown in FIG. 13, S1411a in the embodiment shown in FIG. 14A and FIG. 14B, S1502 in the embodiment shown in FIG. 15, S1604 in the embodiment shown in FIG. 16, and S1722 in the embodiment shown in FIG. 17A and FIG. 17B, and/or another process that is used to support technologies described in the specification. In one embodiment, the communications apparatus 1800 further includes a transmitter 1803. The transmitter 1803 may be configured to perform S205 in the embodiment shown in FIG. 2, S322 in the embodiment shown in FIG. 3A and FIG. 3B, S404 in the embodiment shown in FIG. 4, S519 in the embodiment shown in FIG. 5A and FIG. 5B, S702 in the embodiment shown in FIG. 7, S703 in the embodiment shown in FIG. 7, S805 in the embodiment shown in FIG. 8, S922 in the embodiment shown in FIG. 9A and FIG. 9B, S1004 in the embodiment shown in FIG. 10, S1122 in the embodiment shown in FIG. 11A and FIG. 11B, S1222 in the embodiment shown in FIG. 12A and FIG. 12B, S1303 in the embodiment shown in FIG. 13, S1419 in the embodiment shown in FIG. 14A and FIG. 14B, and S1503 in the embodiment shown in FIG. 15, and/or another process that is used to support technologies described in the specification. All related information about all operations in the foregoing method embodiments may all be referred to in function descriptions of corresponding function modules, and details are not described herein again.

Figure 19:
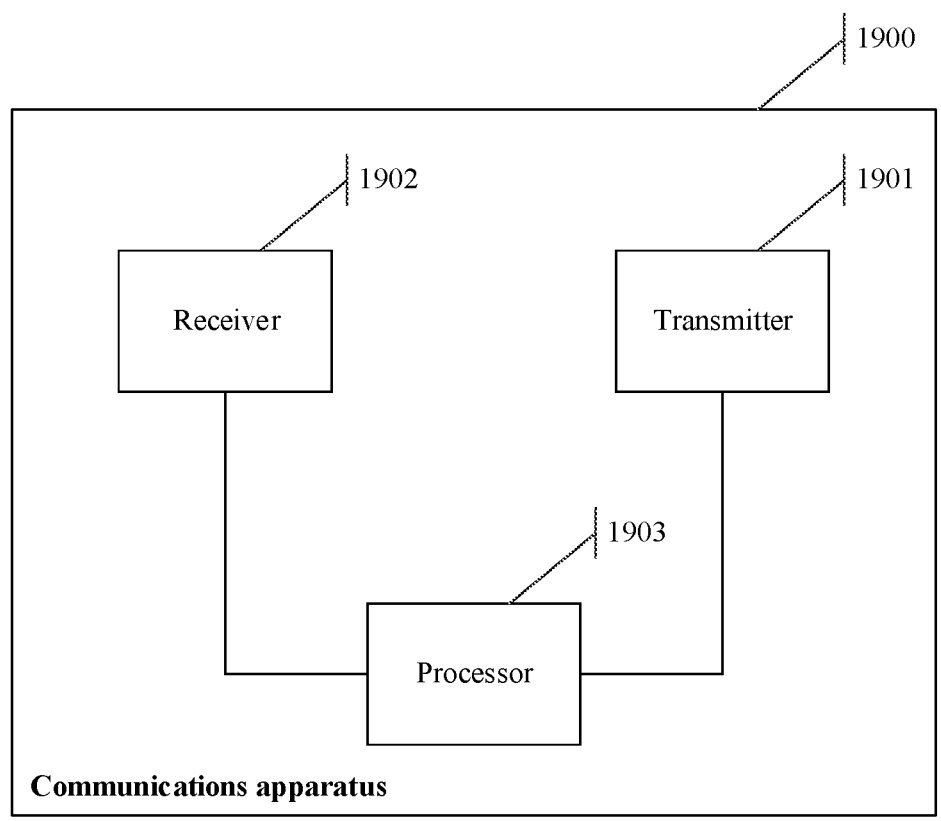

FIG. 19 is a structural schematic diagram of a communications apparatus 1900. The communications apparatus 1900 may implement functions of a first device, and the first device may be the foregoing PCF, AMF or UDM. The communications apparatus 1900 may include a transmitter 1901 and a receiver 1902. The transmitter 1901 may be configured to perform S202 in the embodiment shown in FIG. 2, S314b in the embodiment shown in FIG. 3A and FIG. 3B, S402 in the embodiment shown in FIG. 4, S511b in the embodiment shown in FIG. 5A and FIG. 5B, S701 in the embodiment shown in FIG. 7, S803 in the embodiment shown in FIG. 8, S914b in the embodiment shown in FIG. 9A and FIG. 9B, S1002 in the embodiment shown in FIG. 10, S1118 in the embodiment shown in FIG. 11A and FIG. 11B, S1214b in the embodiment shown in FIG. 12A and FIG. 12B, S1301 in the embodiment shown in FIG. 13, S1411a in the embodiment shown in FIG. 14A and FIG. 14B, S1502 in the embodiment shown in FIG. 15, S1604 in the embodiment shown in FIG. 16, and S1722 in the embodiment shown in FIG. 17A and FIG. 17B, and/or another process that is used to support technologies described in the specification. The receiver 1902 may be configured to perform S201 in the embodiment shown in FIG. 2, S314a in the embodiment shown in FIG. 3A and FIG. 3B, S401 in the embodiment shown in FIG. 4, S511a in the embodiment shown in FIG. 5A and FIG. 5B, S802 in the embodiment shown in FIG. 8, S914a in the embodiment shown in FIG. 9A and FIG. 9B, S1001 in the embodiment shown in FIG. 10, S1104 in the embodiment shown in FIG. 11A and FIG. 11B, S1110 in the embodiment shown in FIG. 11A and FIG. 11B, S1214a in the embodiment shown in FIG. 12A and FIG. 12B, S1501 in the embodiment shown in FIG. 15, S1601 in the embodiment shown in FIG. 16, and S1720 in the embodiment shown in FIG. 17A and FIG. 17B, and/or another process that is used to support technologies described in the specification. In one embodiment, the communications apparatus 1900 further includes a processor 1903. The processor 1903 may be configured to perform S1602 in the embodiment shown in FIG. 16, and S1720 in the embodiment shown in FIG. 17A and FIG. 17B, and/or another process that is used to support technologies described in the specification. All related information about all operations in the foregoing method embodiments may all be referred to in function descriptions of corresponding function modules, and details are not described herein again.

In the embodiments of the present application, the communications apparatus 1800 and the communications apparatus 1900 may be illustrated in a form of dividing each function module that is corresponding to each function, or may be illustrated in a form of dividing each function module in an integrated manner. The module may mean an application-specific integrated circuit (ASIC), a memory and a processor that is used to perform one or more software or hardware program, an integrated logic circuit, and/or another component that may provide the foregoing functions.

Figure 20:
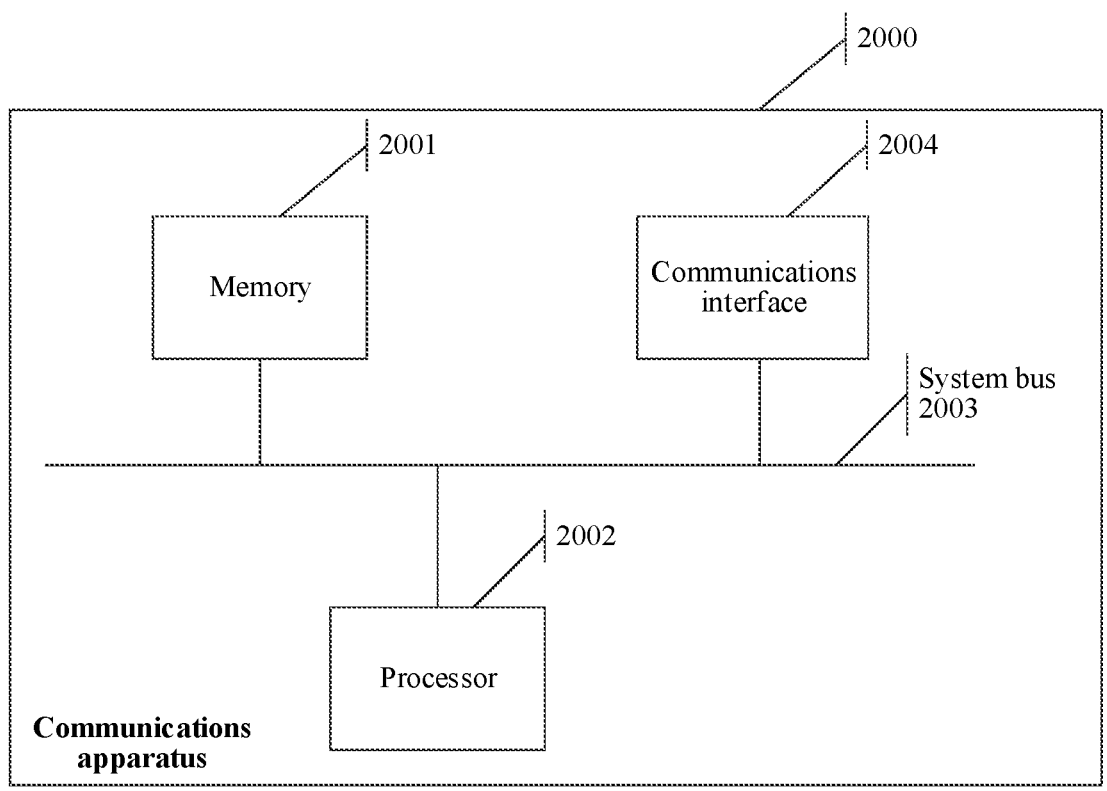

In a simple embodiment, persons skilled in the art may realize that any one of the communications apparatus 1800 to the communications apparatus 1900 may be implemented by using a structure as shown in FIG. 20.

As shown in FIG. 20, a communications apparatus 2000 may include: a memory 2001, a processor 2002, a system bus 2003, and a communications interface 2004. The processor 2002, the memory 2001, and the communications interface 2004 are connected through the system bus 2003. The memory 2001 is configured to store a computer executing instruction. When the communications apparatus 2000 runs, the processor 2002 executes the computer executing instruction that is stored in the memory 2001, to enable the communications apparatus 2000 to perform the method that is provided by any one of embodiments from the embodiment shown in FIG. 2 to the embodiment shown in FIG. 17A and FIG. 17B. The method may be referred to in related descriptions in the foregoing statements and the accompanying drawings, and details are not described herein again. The communications interface 2004 may be implemented by using a transceiver, or be implemented by using independent receiver and transmitter.

In an example, a receiver 1802 and a transmitter 1803 may correspond to the communications interface 2004 as shown in FIG. 20. A processor 1801 may be embedded in or independent of the memory 2001 in the communications apparatus 2000 in a hardware form/software form.

In an example, a transmitter 1901 and a receiver 1902 may correspond to the communications interface 2004 as shown in FIG. 20. A processor 1903 may be embedded in or independent of the memory 2001 in the communications apparatus 2000 in a hardware form/software form.

In one embodiment, the communications apparatus 2000 may be a field-programmable gate array (FPGA), an application specific integrated circuit (ASIC), a system on chip (SoC), a central processor unit (CPU), a network processor (NP), a digital signal processor (DSP), a micro controller unit MCU), or a programmable logic device (PLD) or another integrated chip may be used. Alternatively, the communications apparatus 2000 may be a separate network element, for example, the foregoing SMF, PCF, AMF, or UDM.

In addition, the communications apparatus provided by the embodiment shown in FIG. 18 may further be implemented in another form. For example, the communications apparatus includes a receiving unit and a processing unit. The processing unit may be configured to perform S204 in the embodiment shown in FIG. 2, S314b in the embodiment shown in FIG. 3A and FIG. 3B, S403 in the embodiment shown in FIG. 4, S511c in the embodiment shown in FIG. 5A and FIG. 5B, S701 in the embodiment shown in FIG. 7, S804 in the embodiment shown in FIG. 8, S914b in the embodiment shown in FIG. 9A and FIG. 9B, S1003 in the embodiment shown in FIG. 10, S1118 in the embodiment shown in FIG. 11A and FIG. 11B, S1214b in the embodiment shown in FIG. 12A and FIG. 12B, S1302 in the embodiment shown in FIG. 13, S1411a in the embodiment shown in FIG. 14A and FIG. 14B, S1502 in the embodiment shown in FIG. 15, S1605 in the embodiment shown in FIG. 16, and S1722 in the embodiment shown in FIG. 17A and FIG. 17B, and/or another process that is used to support technologies described in the specification. The receiving unit may be configured to perform S203 in the embodiment shown in FIG. 2, S314b in the embodiment shown in FIG. 3A and FIG. 3B, S402 in the embodiment shown in FIG. 4, S511c in the embodiment shown in FIG. 5A and FIG. 5B, S701 in the embodiment shown in FIG. 7, S803 in the embodiment shown in FIG. 8, S914b in the embodiment shown in FIG. 9A and FIG. 9B, S1003 in the embodiment shown in FIG. 10, S1118 in the embodiment shown in FIG. 11A and FIG. 11B, S1214b in the embodiment shown in FIG. 12A and FIG. 12B, S1301 in the embodiment shown in FIG. 13, S1411a in the embodiment shown in FIG. 14A and FIG. 14B, S1502 in the embodiment shown in FIG. 15, S1604 in the embodiment shown in FIG. 16, and S1722 in the embodiment shown in FIG. 17A and FIG. 17B, and/or another process that is used to support technologies described in the specification. In one embodiment, the communications apparatus further includes a transmitting unit. The transmitting unit may be configured to perform S205 in the embodiment shown in FIG. 2, S322 in the embodiment shown in FIG. 3A and FIG. 3B, S404 in the embodiment shown in FIG. 4, S519 in the embodiment shown in FIG. 5A and FIG. 5B, S702 in the embodiment shown in FIG. 7, S703 in the embodiment shown in FIG. 7, S805 in the embodiment shown in FIG. 8, S922 in the embodiment shown in FIG. 9A and FIG. 9B, S1004 in the embodiment shown in FIG. 10, S1122 in the embodiment shown in FIG. 11A and FIG. 11B, S1222 in the embodiment shown in FIG. 12A and FIG. 12B, S1303 in the embodiment shown in FIG. 13, S1419 in the embodiment shown in FIG. 14A and FIG. 14B, and S1503 in the embodiment shown in FIG. 15, and/or another process that is used to support technologies described in the specification. All related information about all operations in the foregoing method embodiments may all be referred to in function descriptions of corresponding function modules, and details are not described herein again.

In addition, the communications apparatus provided by the embodiment shown in FIG. 19 may also be implemented in another form. For example, the communications apparatus includes a transmitting unit and a receiving unit. The transmitting unit may be configured to perform S202 in the embodiment shown in FIG. 2, S314*b* in the embodiment shown in FIG. 3A and FIG. 3B, S402 in the embodiment shown in FIG. 4, S511*b* in the embodiment shown in FIG. 5A and FIG. 5B, S701 in the embodiment shown in FIG. 7, S803 in the embodiment shown in FIG. 8, S914*b* in the embodiment shown in FIG. 9A and FIG. 9B, S1002 in the embodiment shown in FIG. 10, S1118 in the embodiment shown in FIG. 11A and FIG. 11B, S1214*b* in the embodiment shown in FIG. 12A and FIG. 12B, S1301 in the embodiment shown in FIG. 13, S1411*a* in the embodiment shown in FIG. 14A and FIG. 14B, S1502 in the embodiment shown in FIG. 15, S1604 in the embodiment shown in FIG. 16, and S1722 in the embodiment shown in FIG. 17A and FIG. 17B, and/or another process that is used to support technologies described in the specification. The receiving unit may be configured to perform S201 in the embodiment shown in FIG. 2, S314*a* in the embodiment shown in FIG. 3A and FIG. 3B, S401 in the embodiment shown in FIG. 4, S511*a* in the embodiment shown in FIG. 5A and FIG. 5B, S802 in the embodiment shown in FIG. 8, S914*a* in the embodiment shown in FIG. 9A and FIG. 9B, S1001 in the embodiment shown in FIG. 10, S1104 in the embodiment shown in FIG. 11A and FIG. 11B, S1110 in the embodiment shown in FIG. 11A and FIG. 11B, S1214*a* in the embodiment shown in FIG. 12A and FIG. 12B, S1501 in the embodiment shown in FIG. 15, S1601 in the embodiment shown in FIG. 16, and S1720 in the embodiment shown in FIG. 17A and FIG. 17B, and/or another process that is used to support technologies described in the specification. In one embodiment, the communications apparatus further includes a processing unit. The processing unit may be configured to perform S1602 in the embodiment shown in FIG. 16, and S1720 in the embodiment shown in FIG. 17A and FIG. 17B, and/or another process that is used to support technologies described in the specification. All related information about all operations in the foregoing method embodiments may all be referred to in function descriptions of corresponding function modules, and details are not described herein again.

In addition, an embodiment of the present application further provides a communications entity. The communications entity may implement the functions of the SMF in the method provided by any one of embodiments from the embodiment shown in FIG. 2 to the embodiment shown in FIG. 5, and from the embodiment shown in FIG. 7 to the embodiment shown in FIG. 17A and FIG. 17B. For example, the communications entity may include the communications apparatus 1800 provided by the embodiment shown in FIG. 18 or the communications apparatus 2000 provided by the embodiment shown in FIG. 20.

In addition, an embodiment of the present application further provides a communications entity. The communications entity may implement the functions of the first device in the method provided by any one of embodiments from the embodiment shown in FIG. 2 to the embodiment shown in FIG. 5, and from the embodiment shown in FIG. 7 to the embodiment shown in FIG. 17A and FIG. 17B. For example, the first device is a PCF, an AMF, or a UDM. For example, the communications entity may include the communications apparatus 1900 provided by the embodiment shown in FIG. 19 or the communications apparatus 2000 provided by the embodiment shown in FIG. 20.

The communications apparatus provided by the embodiments of the present application may be configured to perform the method provided by any one of embodiments from the embodiment shown in FIG. 2 to the embodiment shown in FIG. 5, and from the embodiment shown in FIG. 7 to the embodiment shown in FIG. 17A and FIG. 17B. Therefore, a technical effect that the communications apparatus can obtain may be referred to in the foregoing method embodiments, and details are not described herein again.

The embodiments of the present application are described with reference to the flowcharts and/or block diagrams of the method, the device (system), and the computer program product based on the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a function in one or more procedures in the flowcharts and/or in one or more blocks in the block diagrams.

All or some of the foregoing embodiments may be implemented by using software, hardware, firmware, or any combination thereof. When software is used to implement the embodiments, the embodiments may be implemented entirely or partially in a form of a computer program product. The computer program product includes one or more computer instructions. When the computer program instructions are loaded and executed on the computer, the procedure or functions according to the embodiments of the present application are entirely or partially generated. The computer may be a general-purpose computer, a dedicated computer, a computer network, or other programmable apparatuses. The computer instructions may be stored in a computer-readable storage medium or may be transmitted from a computer-readable storage medium to another readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, that integrates one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Obviously, a person skilled in the art can make various modifications and variations to embodiments of the present application without departing from the spirit and scope of this application. This application is intended to cover these modifications and variations provided that they fall within the scope of protection defined by the following claims and their equivalent technologies.

What is claimed is:

1. A method for deleting a session context comprising:
receiving, by a first device, a delete request message, wherein the delete request message is used to instruct the first device to trigger releasing a packet data unit (PDU) session context that is not deleted after a terminal is abnormally deregistered;
sending, by the first device, a PDU session release request to a session management function entity, wherein the PDU session release request is used to instruct the session management function entity to delete the PDU session context stored in the session management function entity;
receiving, by the session management function entity, the PDU session release request; and
deleting, by the session management function entity based on the PDU session release request, the PDU session context that is stored in the session management function entity.

2. The method according to claim 1, wherein after the receiving, by a session management function entity, a PDU session release request, the method further comprises:
sending, by the session management function entity, a packet data unit-based connectivity access network (PDU-CAN) session context termination request to a policy control function entity, wherein the PDU-CAN session context termination request is used to instruct the policy control function entity to delete a PDU-CAN session context that is stored in the policy control function entity and that is of the terminal, and the PDU-CAN session context is a PDU-CAN session context that is not deleted after the terminal is abnormally deregistered.

3. The method according to claim 1, wherein the receiving, by a session management function entity, a PDU session release request comprises:
receiving, by the session management function entity, the PDU session release request sent by a unified data management entity; or
receiving, by the session management function entity, the PDU session release request sent by an access and mobility management function entity; or
receiving, by the session management function entity, the PDU session release request sent by the policy control function entity.

4. The method according to claim 3, wherein the session management function entity is a session management function entity serving for the terminal before the terminal roams, and after the receiving, by a session management function entity, a PDU session release request, the method further comprises:
sending, by the session management function entity, the PDU session release request to another session management function entity, wherein the PDU session release request is used to instruct the another session management function entity to delete a PDU session context that is stored in the another session management function entity and that is of the terminal, and the another session management function entity is a session management function entity serving for the terminal after the terminal roams.

5. The method according to claim 1, wherein if the first device is the policy control function entity, after receiving, by the first device, the delete request message sent by the access and mobility management function entity, the method further comprises:
deleting, by the first device, a PDU-CAN session context that is stored in the first device and not deleted after the terminal is abnormally deregistered.

6. A communications system comprising:
a first device; and
a session management function entity, wherein the first device is configured to:
receive a delete request message, wherein the delete request message is used to instruct the first device to trigger releasing a packet data unit (PDU) session context that is not deleted after a terminal is abnormally deregistered, and send a PDU session release request to the session management function entity, wherein the PDU session release request is used to instruct the session management function entity to delete the PDU session context stored in the session management function entity;
wherein, the session management function entity is configured to receive the PDU session release request and delete the PDU session context that is stored in the session management function entity.

7. The system according to claim 6, wherein the session management function entity is further configured to:
send a packet data unit-based connectivity access network (PDU-CAN) session context termination request to a policy control function entity, wherein the PDU-CAN session context termination request is used to instruct the policy control function entity to delete a PDU-CAN session context that is stored in the policy control function entity and that is of the terminal, and the PDU-CAN session context is a PDU-CAN session context that is not deleted after the terminal is abnormally deregistered.

8. The system according to claim 6, wherein the session management function entity is further configured to:
receive the PDU session release request sent by a unified data management entity; or
receive the PDU session release request sent by an access and mobility management function entity; or
receive the PDU session release request sent by the policy control function entity.

9. The system according to claim 8, wherein the session management function entity is further configured to:
send the PDU session release request to another session management function entity, wherein the PDU session release request is used to instruct the another session management function entity to delete a PDU session context that is stored in the another session management function entity and that is of the terminal, and the another session management function entity is a session management function entity serving for the terminal after the terminal roams.

10. The system according to claim 6, wherein the first device is further configured to:
delete a PDU-CAN session context that is stored in the first device and not deleted after the terminal is abnormally deregistered.

11. A communications system comprising:
a session management function entity; and
a first device including a processor, a transmitter, and receiver, wherein the first device receives from the receiver a delete request message, wherein the delete request message is used to instruct the processor of the first device to trigger releasing a packet data unit (PDU) session context that is not deleted after a terminal is abnormally deregistered and to send via the transmitter the PDU session release request to the session management function entity, wherein the PDU session release request is used to instruct the session management function entity to delete the PDU session context stored in the session management function entity;

wherein the session management function entity receives the PDU session release request and is configured to delete, based on the PDU session release request, the PDU session context that is stored in the session management function entity.

12. The system according to claim 11, wherein the session management function entity is further configured to:

send a packet data unit-based connectivity access network (PDU-CAN) session context termination request to a policy control function entity, wherein the PDU-CAN session context termination request is used to instruct the policy control function entity to delete a PDU-CAN session context that is stored in the policy control function entity and that is of the terminal, and the PDU-CAN session context is a PDU-CAN session context that is not deleted after the terminal is abnormally deregistered.

13. The system according to claim 11, wherein the session management function entity is further configured to:

receive the PDU session release request sent by a unified data management entity; or receive the PDU session release request sent by an access and mobility management function entity; or receive the PDU session release request sent by the policy control function entity.

14. The system according to claim 13, wherein the session management function entity is a session management function entity serving for the terminal before the terminal roams, and after the receiving, by the session management function entity, a PDU session release request, the session management function entity is further configured to:

send the PDU session release request to another session management function entity, wherein the PDU session release request is used to instruct the another session management function entity to delete a PDU session context that is stored in the another session management function entity and that is of the terminal, and the another session management function entity is a session management function entity serving for the terminal after the terminal roams.

* * * * *